US009570102B2

(12) United States Patent
Kobayashi et al.

(10) Patent No.: US 9,570,102 B2

(45) Date of Patent: Feb. 14, 2017

(54) INFORMATION RECORDING AND REPRODUCING APPARATUS AND INFORMATION RECORDING AND REPRODUCING METHOD

(71) Applicant: PANASONIC INTELLECTUAL PROPERTY MANAGEMENT CO., LTD., Osaka (JP)

(72) Inventors: Isao Kobayashi, Osaka (JP); Kohei Nakata, Nara (JP); Yasumori Hino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/166,112

(22) Filed: May 26, 2016

(65) Prior Publication Data

US 2016/0275981 A1 Sep. 22, 2016

Related U.S. Application Data

(63) Continuation of application No. PCT/JP2014/004543, filed on Sep. 4, 2014.

(30) Foreign Application Priority Data

Jan. 17, 2014 (JP) ................................ 2014-006554

(51) Int. Cl.
*G11B 7/0045* (2006.01)
*G11B 20/10* (2006.01)
(Continued)

(52) U.S. Cl.
CPC ......... *G11B 7/00456* (2013.01); *G11B 7/0045* (2013.01); *G11B 7/0062* (2013.01);
(Continued)

(58) Field of Classification Search
CPC ... G11B 27/24; G11B 27/3027; G11B 7/0053; G11B 20/1403; G11B 7/12672; G11B 7/00736; G11B 20/10009; G11B 7/00; G11B 20/1217; G11B 7/005; G11B 7/00456; G11B 7/006
(Continued)

(56) References Cited

U.S. PATENT DOCUMENTS 6,101,159 A 8/2000 Shoji et al.
6,157,609 A 12/2000 Shoji et al.
(Continued)

FOREIGN PATENT DOCUMENTS

JP 2000-231719 A 8/2000
JP 2007-213731 A 8/2007
(Continued)

OTHER PUBLICATIONS

International Search Report issued in corresponding International Patent Application No. PCT/JP2014/004543, mailed on Sep. 30, 2014; with English translation.

*Primary Examiner* — Nabil Hindi
(74) *Attorney, Agent, or Firm* — McDermott Will & Emery LLP

(57) ABSTRACT

An information recording and reproducing apparatus including: a reproducing unit which generates a digital signal from an analog signal; a recording compensation unit which generates an expectation signal from the digital signal, detects a signal difference between the digital signal and the expectation signal, and adjusts a recording condition for recording the information; and a recording unit configured to record the information based on the recording condition. First recording compensation is performed for adjusting the recording condition using first recording where lengths of a preceding space and a succeeding space of a first recording mark and lengths of a preceding space and a succeeding
(Continued)

space of a second recording mark are not in intersymbol interference; and second recording compensation is performed for adjusting the recording condition for the first recording mark using second recording data for changing a length of the second recording mark.

6 Claims, 20 Drawing Sheets

(51) Int. Cl.
*G11B 7/006* (2006.01)
*G11B 7/1263* (2012.01)
*G11B 7/1267* (2012.01)

(52) U.S. Cl.
CPC .. *G11B 20/10009* (2013.01); *G11B 20/10037* (2013.01); *G11B 20/10194* (2013.01); *G11B 7/1263* (2013.01); *G11B 7/1267* (2013.01)

(58) Field of Classification Search
USPC .................... 369/47.53, 47.19, 47.27, 47.28, 59.11,369/59.12, 53.34, 124.04, 124.08, 124.11, 59.22
See application file for complete search history.

(56) References Cited

U.S. PATENT DOCUMENTS

| | | | | |
|---|---|---|---|---|
| 8,773,963 | B2 * | 7/2014 | Fujita .................. | G11B 7/0062 369/59.11 |
| 2007/0008850 | A1 | 1/2007 | Nakajo | |
| 2009/0316561 | A1 | 12/2009 | Nishimura et al. | |
| 2010/0322057 | A1 | 12/2010 | Nakamura et al. | |
| 2011/0026383 | A1 | 2/2011 | Minemura et al. | |

FOREIGN PATENT DOCUMENTS

| | | | |
|---|---|---|---|
| JP | 2008-112509 | A | 5/2008 |
| JP | 2010-003328 | A | 1/2010 |
| JP | 2011-023069 | A | 2/2011 |
| JP | 2011-081901 | A | 4/2011 |

* cited by examiner

FIG. 16A

| | | Recording mark | | | |
|---|---|---|---|---|---|
| | | 2T | 3T | 4T | ≧5T |
| Preceding space | 2T | X1 | X5 | X9 | X13 |
| | 3T | X2 | X6 | X10 | X14 |
| | 4T | X3 | X7 | X11 | X15 |
| | ≧5T | X4 | X8 | X12 | X16 |

FIG. 16B

| | | Recording mark | | | |
|---|---|---|---|---|---|
| | | 2T | 3T | 4T | ≧5T |
| Preceding space | 2T | X17 | X21 | X25 | X29 |
| | 3T | X18 | X22 | X26 | X30 |
| | 4T | X19 | X23 | X27 | X31 |
| | ≧5T | X20 | X24 | X28 | X32 |

FIG. 17A

| | | Recording mark | | | |
|---|---|---|---|---|---|
| | | 2T | 3T | 4T | ≧5T |
| Preceding space | 2T | Y1 | Y5 | Y9 | Y13 |
| | 3T | Y2 | Y6 | Y10 | Y14 |
| | 4T | Y3 | Y7 | Y11 | Y15 |
| | ≧5T | Y4 | Y8 | Y12 | Y16 |

FIG. 17B

| | | Recording mark | | | |
|---|---|---|---|---|---|
| | | 2T | 3T | 4T | ≧5T |
| Preceding space | 2T | Y17 | Y21 | Y25 | Y29 |
| | 3T | Y18 | Y22 | Y26 | Y30 |
| | 4T | Y19 | Y23 | Y27 | Y31 |
| | ≧5T | Y20 | Y24 | Y28 | Y32 |

INFORMATION RECORDING AND REPRODUCING APPARATUS AND INFORMATION RECORDING AND REPRODUCING METHOD

RELATED APPLICATIONS

This application is a Continuation of International Patent Application No. PCT/JP2014/004543, filed on Sep. 4, 2014, which in turn claims the benefit of Japanese Application No. 2014-006554, filed on Jan. 17, 2014, the disclosures of which Applications are incorporated by reference herein.

BACKGROUND

1. Technical Field

The present disclosure relates to an information recording and reproducing apparatus and an information recording and reproducing method, both capable of performing recording compensation more accurately to an information recording medium having an information recording surface to which information is optically recordable, the recording compensation being performed for realizing high density recording more stably.

2. Description of Related Art

Conventionally, information recording media such as DVDs (Digital Versatile Discs) and BDs (Blu-ray (registered trademark) Discs) are used as recording media aimed at general users for storing video or data. In recent years, BDs have come to be used in data archivers for storing important data for an extended period of time with a highly reliable system. Data archivers are a product that is mainly available for business use, and are required to have higher density in order to allow more data to be stored.

In such an information recording medium, information is recorded by forming a recording mark and a space over a recording layer of the information recording medium.

When the information in the information recording medium is reproduced, the recording mark and the space formed over the recording layer are irradiated with laser light of low output power, and a reproduced signal is obtained based on a difference between optical characteristics, e.g., reflectance ratios, of the recording mark and the space. By performing signal processing on the reproduced signal, the recorded information is reproduced.

When information is recorded to the information recording medium, based on information to be recorded, the recording layer is irradiated with a recording pulse obtained by intensity modulation to laser light and a recording mark is recorded.

An information recording and reproducing apparatus that performs recording and reproducing on the information recording medium performs recording compensation of adjusting a leading edge position and a trailing edge position of the recording mark such that errors in reproduced signals obtained by reproducing the recorded recording mark are reduced.

The recording compensation is particularly required in a recording density in which a length of a space between recording marks is short. In the recording density in which the length of a space between recording marks is short, heat generated when a recording mark is formed is not sufficiently reduced at a space section, and affects a temperature rise at a leading edge of a succeeding recording mark. Adversely, the heat at the leading end of the succeeding recording mark affects the cooling of the heat at a trailing edge of the preceding recording mark. Such an influence is referred to as thermal interference, which depends on a length of the space. In the recording compensation, a shape of a pulse of recording laser is finely adjusted depending on the length of the space in order to compensate positions of the edges of the recording marks that change depending on the thermal interference.

Further, as lengths of the recording mark and the space are reduced, amplitude of a reproduced signal is also reduced, and a difference is produced between reproduced signals according to a combination of the recording mark and the space due to an influence of symbol interference. For example, even if the length of the recording marks is the same, depending on a difference between lengths of spaces before and after the recording marks, reproduced signals in particular at the edge portions of the recording marks are detected differently. Therefore, it is considered to be effective to employ a method such as PRML (Partial Response Maximum Likelihood) as a method of reproduced signal processing. By performing waveform equalization of the reproduced signals by the PRML method to reduce the influence of the intersymbol interference, it is possible to perform recording compensation more accurately.

Unexamined Japanese Patent Publication No. 2011-23069, for example, discloses one example of a method of detecting an edge shift which is displacement between edge positions of recording marks in order to perform waveform equalization of reproduced signals by the PRML method to perform recording compensation.

In Unexamined Japanese Patent Publication No. 2011-23069, focusing on edges of a recording mark in a maximum likelihood bit stream that is a reproduced signals decoded by the PRML method, an error bit stream is generated, which is a bit stream that is most susceptible to error in which a bit of a maximum likelihood bit stream at the edge portion or a bit of a maximum likelihood bit stream in an entire recording marks including edge portions shifts, and the edge shift is evaluated based on an Euclidean distance difference between a reproduced signal and target signals respectively corresponding to the maximum likelihood bit stream and the error bit stream.

With this, in recording compensation in recording density of about 31 GB in the case of a BD, it is possible to directly detect an edge shift of an edge portion using either of a reproduced signal at an edge portion of a recording mark as a target of recording compensation, or a reproduced signal in a range of the length of a space that is adjacent to this recording mark.

SUMMARY

In order to record with higher recording density, it is necessary to further reduce shortest lengths of a recording mark and a space, and to reduce intervals between physical lengths with respect to differences between lengths of recording marks. At this time, there is more than one recording mark included in a spot of laser light, and edge shifts of edge portions of the respective recording marks are reproduced while interfering each other.

FIG. 2 is a diagram illustrating interference between edge shifts of edge portions of recording marks. In FIG. 2, out of recording marks 202, 203, 204, and 205, recording marks 203, 204, and 205 are present within spot 201 of laser light. Edge portion 206 of recording mark 203 is taken as a target of which edge shift is to be detected. Symbol interference is generated within spot 201 of the laser light, each of the recording marks includes displacement of the corresponding edge, and intersymbol interference 207 of recording mark

204, intersymbol interference 208 and 209 of recording mark 203, and intersymbol interference 210 of recording mark 205 are present as intersymbol interference which is displacement between edges of other recording marks with respect to edge portion 206 of recording mark 204. Thermal interference 211 of recording mark 203 is present as thermal interference with respect to edge portion 206 of recording mark 204.

When a physical length of a space between a recording mark and a recording mark decreases due to densification of recording density, more displacement between edges that are subjected to intersymbol interference is present. Further, since a length of a space from a preceding recording mark decreases, an influence of thermal interference increases.

An influence of intersymbol interference is attenuated as a distance from a target edge of which an edge shift is to be detected increases, and it is substantially possible to detect only an edge shift of a detected edge by using an equalizer (EQ) based on the PRML method.

For example, in Unexamined Japanese Patent Publication No. 2011-23069, a range of detection of an edge shift is not beyond spaces before and after the mark. An edge shift of a recording mark to be detected is related to lengths of spaces before and after the recording mark, but not related to lengths of recording marks before and after the recording mark. With recording density of about 31 GB in the case of a BD, it is possible to appropriately perform recording compensation by detecting an edge shift as described in Unexamined Japanese Patent Publication No. 2011-23069.

However, when the recording density is further densified, for example, about 40 GB or 50 GB in the case of a BD, it is not possible to accurately perform conventional edge shift detection. This is because a range of intersymbol interference or thermal interference described above increases, and because a signal band of a reproduced signal is used beyond a range of optical resolution.

When recording marks formed over a recording layer and spaces between the recording marks are reproduced using laser light, amplitude of a reproduced signal decreases as the lengths of the recording marks and the spaces between the recording marks decrease, and decreases down to zero beyond the optical resolution.

An inverse number of a recurrence period of the recording marks and the spaces between the recording marks corresponding to the same channel clock length is called a space frequency. A transfer function of the space frequency is called an OTF (Optical Transfer Function). Further, a function representing amplitude dependence of the OTF to the space frequency is called an MTF (Modulation Transfer Function).

A condition that amplitude of a reproduced signal becomes zero is that lengths L of the recording marks and the spaces between the recording marks are shorter than $\lambda/(4\times NA)$ where $\lambda$ is a wavelength of laser and NA is a numerical aperture of an objective lens. For example, in a case of a BD system, generally, since $\lambda$ is 405 nm and NA is 0.85, length L is about 119.1 nm. This corresponds to a case of a recording density of about 31 GB, assuming that a disk structure is the same. Therefore, in recording where the recording density is about 31 GB, amplitude becomes zero for a continuous signal of a shortest run length.

Specifically, when the recording density is further densified, since the space frequency of the MTF shifts to a side of a frequency lower than the signal band, a space frequency having no signal amplitude is present. However, it is not possible to perform waveform equalization to a reproduced signal having no signal amplitude. As a result, it is not possible to reduce intersymbol interference by performing waveform equalization to a reproduced signal based on the PRML method as in the conventional manner.

Moreover, in detection of an edge shift in Unexamined Japanese Patent Publication No. 2011-23069, there is a pattern in which detected edges are overlapped.

According to one example of edge detection in Unexamined Japanese Patent Publication No. 2011-23069, when a maximum likelihood bit stream includes "011000", a right-shift bit stream is generated, the right-shift bit stream having shifted to a mask bit stream "000100" from a maximum likelihood bit stream, and an edge shift to the bit stream "011000" is detected based on the Euclidean distance difference between the reproduced signal, the maximum likelihood bit stream, and the right-shift bit stream.

Further, according to another example of edge detection, when a maximum likelihood bit stream includes "1110011000", a right-shift bit stream is generated, the right-shift bit stream having shifted to a mask bit stream "0000010100" from a maximum likelihood bit stream, and an edge shift to the bit stream "1110011000" is detected based on the Euclidean distance difference between the reproduced signal, the maximum likelihood bit stream, and the right-shift bit stream.

At this time, the bit stream "011000" is present as a common bit stream in the bit stream "011000" and the bit stream "1110011000". Specifically, two edge shifts are detected for one edge. However, recording compensation to one edge is performed only for a recording condition such as a pulse position or a width of a recording pulse. Accordingly, it is very difficult to reduce two edge shifts at the same time by recording compensation.

Two edge shifts are present for one edge because a pattern that is most susceptible to an error varies depending on a length of a bit stream. In high density recording, a number of patterns that is most susceptible to an error depending on a length of a bit stream further increases, since a range of intersymbol interference increases. Accordingly, more than one edge shift is detected for one edge, and it is not possible to determine a correct edge shift, and therefore recording compensation may not be performed.

As described above, in a recording density beyond optical resolution, and with further densified recording density, it is not possible to correctly detect an edge shift based on the conventional method of detecting an edge shift from a reproduced signal near an edge portion.

In order to solve the above problem, an object of the present disclosure is to provide an information recording and reproducing apparatus and an information recording and reproducing method, both capable of performing appropriate recording compensation in high density recording, in order to realize recording with a reduced error rate in recorded information by removing interference such as symbol interference and thermal interference, and by detecting an edge shift more accurately.

In order to achieve the object, an information recording and reproducing apparatus according to the present disclosure includes a reproducing unit configured to generate a digital signal from an analog signal as information recorded in an information recording medium, a recording compensation unit configured to decode the digital signal into a binary signal, generate an expectation signal based on the binary signal, detect a signal difference between the digital signal and the expectation signal, and adjust a recording condition for recording information into the information recording medium based on the signal difference, and a recording unit configured to record the information into the information recording medium based on the recording condition. The adjustment of the recording condition is performed by first recording compensation for adjusting the recording condition using first recording data having a length with which lengths of a preceding space and a succeeding space of a first recording mark and lengths of a preceding space and a succeeding space of a second recording mark are not in intersymbol interference, and second recording compensation for adjusting the recording condition for the first recording mark using second recording data for changing a length of the second recording mark, while the second recording mark of which the first recording compensation has been performed is located before or after the first recording mark of which the first recording compensation has been performed, and the length of the space between the first recording mark and the second recording mark to be constant.

By performing recording compensation in high density recording using the information recording and reproducing apparatus and the information recording and reproducing method according to the present disclosure, it is possible to obtain a recording condition for reducing an error rate of recording information, and to provide a more stable recording and reproducing system.

BRIEF DESCRIPTION OF DRAWINGS

FIG. 16A is a diagram illustrating edge shift X at a leading edge in a detection pattern according to the second exemplary embodiment.

FIG. 16B is a diagram illustrating edge shift X at a trailing edge in the detection pattern according to the second exemplary embodiment.

FIG. 17A is a diagram illustrating signal difference Y at the leading edge in the detection pattern according to the second exemplary embodiment.

FIG. 17B is a diagram illustrating signal difference Y at the trailing edge in the detection pattern according to the second exemplary embodiment.

DESCRIPTION OF EMBODIMENTS

Hereinafter, exemplary embodiments will be described in detail with reference to the drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

Also, it should be noted that the following description and the accompanying drawings are provided to allow any person skilled in the art to fully understand the present disclosure, and that it is not intended to limit the subject matter described in the claims by the following description and the accompanying drawings.

In the exemplary embodiments, high density recording beyond optical resolution in a BD system will be described. Therefore, an information recording medium used in the exemplary embodiments is basically configured as a BD, which is an information recording medium for recording with an increased recording density. At this time, the recording density beyond optical resolution is equal to or greater than about 31 GB, but the present disclosure is not limited to the recording density equal to or greater than about 31 GB, and may be applied to a recording density below optical resolution.

Further, as modulation codes in the exemplary embodiments, RLL (Run Length Limited) codes such as RLL (1, 7) codes are used. At this time, the description is given assuming that the shortest run length of the modulation codes is 2T and the longest run length of the modulation codes is 8T. Therefore, length 2T of the shortest mark and the shortest space is equal to or shorter than about 119.1 nm.

Figure 3:
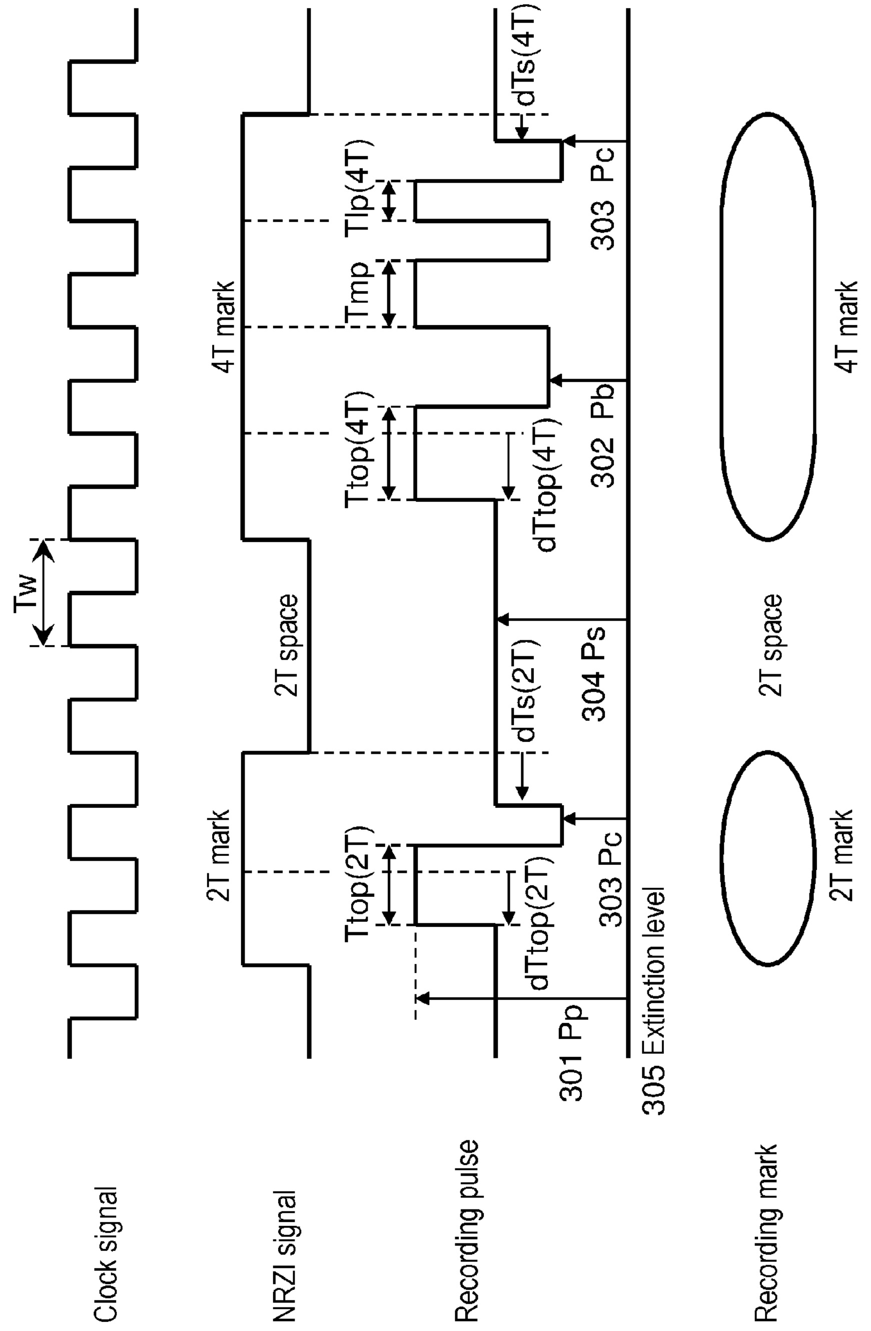
FIG. 3 is a diagram illustrating a recording pulse waveform and recording power.

First, a recording pulse in the exemplary embodiments will be described. FIG. 3 is a diagram illustrating a recording pulse waveform and recording power.

FIG. 3 shows a clock signal, an NRZI (Non Return to Zero Inverting) signal, a recording pulse and a recording mark of a multi-pulse train from top of the figure.

The clock signal is cycle Tw of a channel clock as a reference signal when recording data is generated, and a time interval for a recording mark and a space of the NRZI signal as a recording signal is determined based on cycle Tw. As one partial example, the NRZI signal represents a recording pattern of 2T mark-2T space-4T mark.

The multi-pulse train is a multi-pulse train of laser light for forming a recording mark. Recording power Pw of the multi-pulse train includes peak power Pp301 having a heating effect, bottom power Pb302 and cooling power Pc303 both having a cooling effect, and space power Ps304 as recording power at a space section that are required for formation of recording marks. Peak power Pp301, bottom power Pb302, cooling power Pc303, and space power Ps304 are set taking extinction level 305 detected as a reference level in extinction of laser light. A level of each recording power may be set according to the length of the recording mark.

Regarding pulse widths, top pulse width Ttop is set for each of recording signals of 2T, 3T, 4T, 5T, or longer. Pulse widths Tmp after Ttop in the multi-pulse trains equal to or greater than 3T are considered to have the same setting, and last pulse width Tmp is set as last pulse width Tlp. Last pulse width Tlp is set for each of recording signals of 3T, 4T, 5T, or longer. Further, for the length of each of the recording marks, recording starting position offset dTtop for adjusting a leading end position of the recording mark, and recording end position offset dTs for adjusting a trailing end position are set.

Recording compensation according to the exemplary embodiments is to adjust recording parameters (such as Ttop and dTtop) of the recording pulse to an optimal recording condition for each of the recording marks. Further, in a recording mark to which the recording compensation is performed, changing the recording parameters of the recording pulse depending on a length of a preceding space or a succeeding space is called space compensation.

The recording condition as the recording parameters such as values of recording power or pulse widths of a multi-pulse train are described within the information recording medium. It should be noted that a recording device for recording data to the information recording medium may obtain unique information of the information recording medium and perform recording using a recording condition previously recorded in the recording device.

Therefore, by reproducing recording power and pulse widths of a multi-pulse train recorded in the information recording medium or the recording device, and by irradiating a recording layer of the information recording medium with laser light, it is possible to form recording marks as illustrated in FIG. 3.

Figure 4A:
FIG. 4A is a diagram illustrating a recording pulse in a monopulse waveform.
Figure 4B:
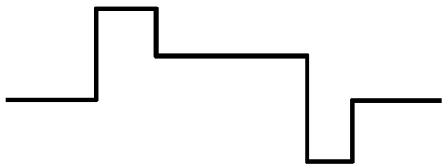
FIG. 4B is a diagram illustrating a recording pulse in an L-shaped pulse waveform.
Figure 4C:
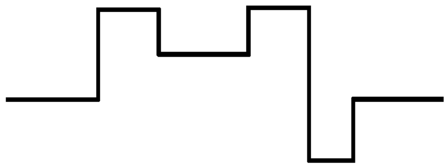
FIG. 4C is a diagram illustrating a recording pulse in a Castle-type pulse waveform.

Examples of a shape of the recording pulse include recording pulses as illustrated in FIG. 4A, FIG. 4B, and FIG. 4C, other than the waveform of the multi-pulse train illustrated in FIG. 3. FIG. 4A shows a monopulse waveform, FIG. 4B shows an L-shaped pulse waveform, and FIG. 4C shows a Castle-type pulse waveform of the recording pulse. These recording pulse waveforms have different heat quantities that may be accumulated in the recording layer of the information recording medium. Therefore, a shape of the recording pulse according to a film characteristic of the recording layer is selected in order to form an optimal recording mark.

First Exemplary Embodiment

Next, recording compensation to an edge shift according to a first exemplary embodiment will be described. In the first exemplary embodiment, recording compensation of each of the recording marks is first performed using recording data between preceding and succeeding spaces that are sufficiently long.

The lengths of the spaces are set to a length that is not affected by intersymbol interference of preceding and succeeding recording marks. For example, a space length is calculated by defining N times (N is a positive real number) of space length $\lambda/(4\times NA)$, which is a condition that amplitude of a reproduced signal becomes zero, as space length $(\lambda/(4\times NA))\times N$, and by setting N to a large value such as N=10, for example. The space length is a length in which there is no intersymbol interference with other recording marks, and therefore set to be longer than the longest run length in the modulation code. Further, if intersymbol interference can be removed by signal processing such as waveform equalization, the space length may be set to be slightly shorter than the longest run length in the modulation code. Further, if intersymbol interference between preceding and succeeding recording marks can be removed, lengths of the preceding and succeeding spaces may be different.

With this, it is possible to detect an edge shift of a recording mark to which recording compensation is to be performed without interference from an edge shift of a different recording mark, and to optimize the recording condition. The recording mark positioned between the preceding and succeeding spaces that are set to have no interference from an edge shift of a different recording mark is defined to be an isolated mark.

Figure 5:
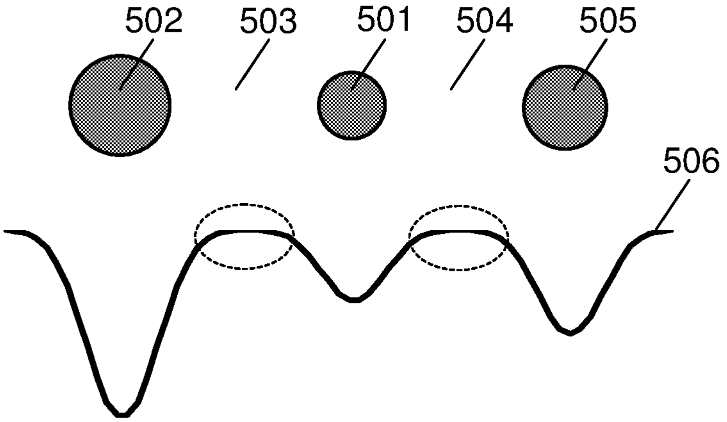
FIG. 5 is a diagram illustrating an isolated mark and a reproduced signal for performing recording compensation in the first exemplary embodiment.

FIG. 5 is a diagram illustrating the isolated mark and the reproduced signal for performing recording compensation. Referring to FIG. 5, preceding recording mark 502, preceding space 503, succeeding space 504, and succeeding recording mark 505 are located with respect to isolated mark 501. Reproduced signal 506 is a signal obtained by reproducing isolated mark 501, preceding recording mark 502, preceding space 503, succeeding space 504, and succeeding recording mark 505.

Preceding space 503 and succeeding space 504 are set to be a length in which no intersymbol interference is produced both between preceding recording mark 502 and succeeding recording mark 505 and isolated mark 501. At this time, reproduced signal 506 contains portions having a constant level in reproduced signal 506 encircled by dotted lines in FIG. 5 at preceding space 503 and succeeding space 504.

The constant level is the same as a level of a reproduced signal when there is no recording mark. More accurately, the constant level is the same as a level of a signal obtained by reproducing a track in a recording area that is not depicted after irradiation with space power Ps304 of recording power.

This indicates that there is no symbol interference between the preceding and succeeding recording marks. Further, a period of the constant level depends on the space length. The longer the space length is, the longer the period of the constant level becomes.

As described above, by setting the lengths of the preceding and succeeding spaces to be longer, it is possible to perform recording compensation of isolated mark 501 without interference from an edge shift of a different recording mark. Specifically, it is possible to detect an edge shift, or a length and a phase, for isolated mark 501.

Here, preceding recording mark 502 may be in intersymbol interference with a further preceding recording mark that is not depicted. Similarly, succeeding recording mark 505 may be in intersymbol interference with a further succeeding recording mark that is not depicted. This is because recording compensation of isolated mark 501 is not affected by intersymbol interference from a different recording mark. Therefore, it is more desirable that recording data excluding isolated mark 501 and the preceding and succeeding spaces is set to have a recording pattern to which PLL (Phase Locked Loop) or DC (Direct Current) control is easily performed. Examples of the recording pattern include a single signal and a specific recording data that appears only for a limited length. With this, timing of the recording compensation and a level of the reproduced signal may be more accurately detected.

Figure 6:
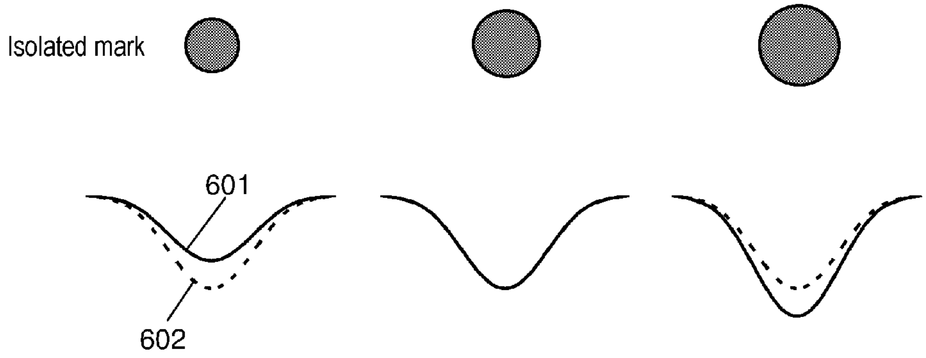
FIG. 6 is a diagram illustrating isolated marks having different lengths and a reproduced signal according to the first exemplary embodiment.

Recording compensation of isolated mark 501 will now be briefly described. FIG. 6 is a diagram illustrating isolated marks having different lengths and a reproduced signal. Three isolated marks having different lengths are located. Reproduced signal 601 is a signal for the recording data, and expectation signal 602 is a signal as a target of reproduced signal 601 when there is no edge shift in the isolated marks. If it is possible to make reproduced signal 601 match expectation signal 602, it is possible to decode as recording data with no error by reproduced signal processing.

Here, the expectation signal according to this exemplary embodiment is assumed to be a linear signal obtained by convolution of a binary signal as the recording data and a response characteristic for 1T (hereinafter, isolated waveform). Examples of the isolated waveform include an MTF characteristic expressed by a time axis, or an equalization coefficient when adaptive equalization processing is performed to a reproduced signal such as a PR equalization characteristic in the PRML method. Therefore, the isolated waveform corresponds to a reproduced signal for recording data 1T.

The recording compensation changes an edge of the isolated mark such that reproduced signal 601 matches expectation signal 602. An edge shift may be detected by a difference between the reproduced signal and the expectation signal at or near an edge position of the isolated mark, or a signal difference of the Euclidean distance. Further, the edge shift may be detected as displacement in length or phase. At this time, displacement in length may be detected, for example, by a difference between a bottom point of the reproduced signal at the center of the isolated mark and a bottom point of the expectation signal, or by a difference between the sum of the squares of energy of the reproduced signal from the constant level and energy of the expectation signal. Displacement in phase may be detected, for example, based on displacement of a bottom point of the reproduced signal and a bottom point of the expectation signal along the time axis, or based on cross-correlation as a value obtained by multiplication and integration of the reproduced signal and the expectation signal.

In this manner, the recording compensation of the isolated mark is performed first in the state in which there is no intersymbol interference from the different recording mark.

However, preceding space 503 and succeeding space 504 have a length that does not appear in the modulation code. In a case in which the recording data of the modulation code is actually recorded, there is produced an influence of thermal interference due to a short space length.

Figure 7A:
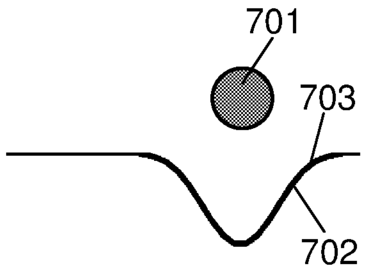
FIG. 7A is a diagram illustrating a reproduced signal and an expectation signal in a case in which the recording mark in the first exemplary embodiment is an isolated mark.
Figure 7B:
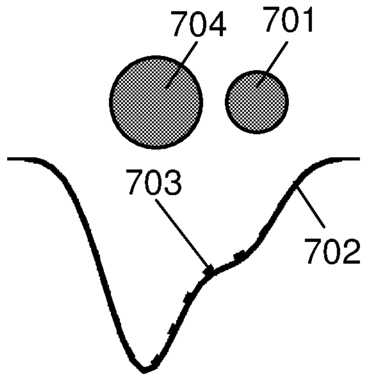
FIG. 7B is a diagram illustrating a reproduced signal and an expectation signal in a case in which there is a recording mark affected by intersymbol interference before the recording mark in the first exemplary embodiment.
Figure 7C:
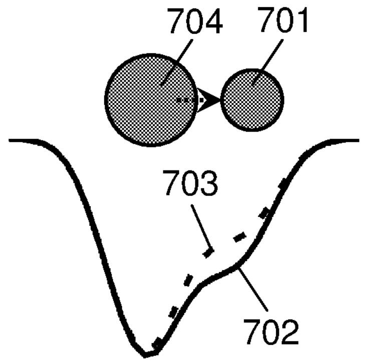
FIG. 7C is a diagram illustrating a reproduced signal and an expectation signal in a case in which the recording mark in the first exemplary embodiment is further affected by thermal interference of the preceding recording mark.

An influence of thermal interference when the space is short is described with reference to FIG. 7A, FIG. 7B, and FIG. 7C. FIG. 7A shows reproduced signal 702 and expectation signal 703 in a case in which recording mark 701 is an isolated mark. FIG. 7B shows reproduced signal 702 and expectation signal 703 in a case in which recording mark 704 as an isolated mark is present before recording mark 701 of which recording compensation has been performed. FIG. 7C shows reproduced signal 702 and expectation signal 703 in a case in which recording mark 701 of which recording compensation has been performed is further affected by thermal interference from preceding recording mark 704.

Reproduced signal 702 is expressed by a solid line, and expectation signal 703 is expressed by a dashed line. FIG. 7B and FIG. 7C are the diagrams illustrating influences of optical interference and thermal interference, and waveforms of expectation signal 703 in FIG. 7B and FIG. 7C are identical since recording marks 701 and 704 are shown at the same position.

Recording marks 701 and 704 as isolated marks are subjected to recording compensation. Specifically, edge shifts of recording marks 701 and 704 are very small. An influence of interference of the edge shift of recording mark 701 to recording mark 704 is very small. At the same time, an influence of interference of the edge shift of recording mark 704 to recording mark 701 is also very small.

Referring to FIG. 7A, recording mark 701 is an isolated mark and subjected to recording compensation. Therefore, reproduced signal 702 is substantially equal to expectation signal 703.

Referring to FIG. 7B, when recording mark 704 is located before recording mark 701 subjected to recording compensation as an isolated mark, reproduced signal 702 is slightly displaced from expectation signal 703 due to an influence of optical interference. The optical interference refers to a phenomenon in which a reproduced signal reproduced when at least two or more recording marks of which recording compensation has been performed as isolated marks are located within a range of intersymbol interference does not match a signal obtained by adding reproduced signals when the recording marks are isolated marks. This is distortion of a reproduced signal occurring in a system for irradiating the recording layer with laser light through a lens and detecting a reproduced signal based on a difference of reflectance ratios. Optical interference has been ignored because it has little influence in recording density with long spaces. There is an influence, however, since the recording is performed with high density.

Referring to FIG. 7C, if the space between recording mark 701 and recording mark 704 is short, a leading edge of recording mark 701 changes due to an influence of heat quantity with which recording mark 704 is recorded, and reproduced signal 702 is distorted with respect to expectation signal 703 due to thermal interference.

As described above, when preceding recording mark 704 is located before recording mark 701, reproduced signal 702 does not match expectation signal 703. Recording compensation of adjusting an edge of a recording mark is performed so that reproduced signal 702 matches expectation signal 703.

Recording compensation is performed while separating optical interference from thermal interference. When recording compensation is performed while separating optical interference from thermal interference, recording compensation to thermal interference is performed in priority as thermal interference has a large influence to distortion of the reproduced signal.

Figure 8:
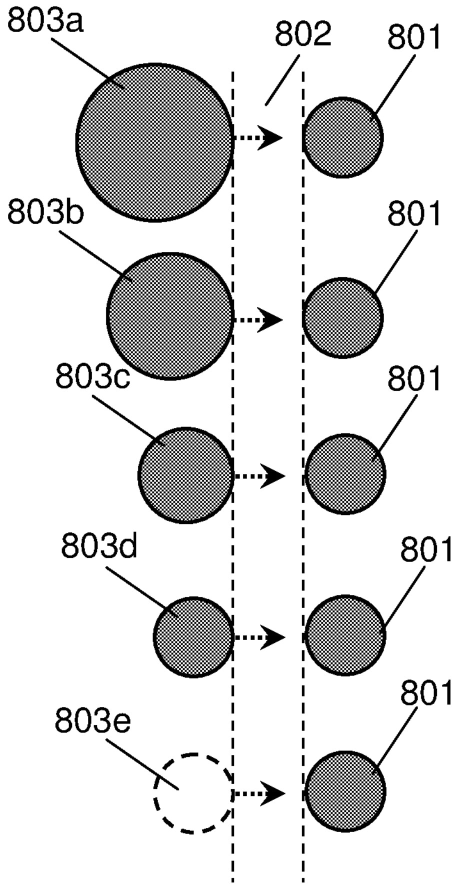
FIG. 8 is a diagram illustrating recording marks that are recorded in order to detect an influence of thermal interference in the first exemplary embodiment.

FIG. 8 is a diagram illustrating recording marks that are recorded in order to detect an influence of thermal interference. In FIG. 8, recording compensation of recording mark 801 of which recording compensation is to be performed is performed on a recording condition of recording mark 801 with respect to preceding space 802. Therefore, a length of recording mark 801 and a length of preceding space 802 are constant.

Referring to FIG. 8, arrows indicate an influence of thermal interference. Preceding recording marks are recording marks 803*a*, 803*b*, 803*c*, 803*d*, and 803*e* having different lengths. Recording mark 803*e* indicates that there is no preceding recording mark, where recording mark 801 is an isolated mark. A state is assumed in which an edge of recording mark 801 is displaced due to an influence of thermal interference when recording mark 801 is an isolated mark. If the state in which the edge is displaced is detected, it is possible to detect only an influence of thermal interference while removing an influence of optical interference.

In the recording data in FIG. 8, a length of preceding space 802 of recording mark 801 and a length of a succeeding space of recording mark 801 are set to a length that is not affected by intersymbol interference from a recording mark positioned beyond each of the spaces. Further, it is desirable to set the recording pattern in FIG. 5 for a range other than part of the recording data in FIG. 8.

Figure 9:
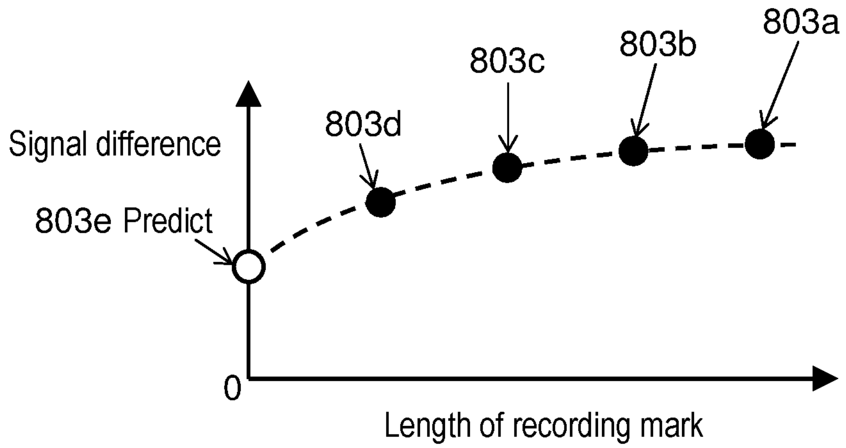
FIG. 9 is a diagram illustrating a signal difference with respect to a length of the preceding recording mark in the first exemplary embodiment.

FIG. 9 is a diagram illustrating a signal difference with respect to a length of the preceding recording mark. In FIG. 9, a horizontal axis indicates the length of the preceding recording mark in FIG. 8, and a vertical axis indicates a signal difference between the expectation signal and the reproduced signal for recording mark 801. Signal differences to the length of the recording mark for preceding recording marks 803*a*, 803*b*, 803*c*, and 803*d* are plotted, and approximation is performed from the plots, so that a signal difference when the length of the recording mark is 0 for preceding recording mark 803*e*, that is, a signal difference when the horizontal axis is 0 may be predicted. If the change of the signal difference to the length of the preceding recording mark is small, this represents that there is little optical interference.

First, a leading edge of recording mark 801 is changed so as to eliminate an influence of thermal interference. This is because a change in the leading edge of recording mark 801 is the largest due to heat quantity of preceding recording mark 803*a*, 803*b*, 803*c*, and 803*d*. Therefore, recording compensation to change the leading edge of recording mark 801 is most effective. However, if recording mark 801 is very small, a trailing edge also changes along with the change in the leading edge, and therefore it is more desirable to perform recording compensation so as to change both the leading edge and the trailing edge.

Next, when an influence of optical interference is removed, the edge is adjusted so that a signal difference is minimized while changing each of preceding recording marks 803*a*, 803*b*, 803*c*, and 803*d*, and recording mark 801. Optical interference has a larger influence when the space length between the preceding recording mark and the recording mark is shorter. Therefore, in order that a signal difference is minimized, recording compensation is the most effective that changes the trailing edges of preceding recording marks 803*a*, 803*b*, 803*c*, and 803*d* and the leading edge of recording mark 801 at the same time.

In this manner, recording compensation of recording mark 801 to preceding recording marks 803*a*, 803*b*, 803*c*, and 803*d* and preceding space 802 is performed. Further, by applying an amount of change in the recording condition that has been changed by recording compensation of preceding recording marks 803*a*, 803*b*, 803*c*, and 803*d* to recording mark 801 having the same length as that of recording mark 801, it is possible to perform recording compensation in which the recording condition may be set more accurately.

As described above, by separating different types of interference such as intersymbol interference, optical interference, and thermal interference, it is possible to perform recording compensation to the edge shift of the recording mark.

With this, it is possible to form a recording mark having little edge shift, and it is possible to record with less error for the reproduced signal as a whole.

It should be noted that while recording compensation of recording mark 801 is performed to preceding space 802 in FIG. 8, it is possible to position a recording mark after recording mark 801 and to perform recording compensation to the succeeding space. Further, recording compensation may be performed both to the preceding space and the succeeding space.

Figure 1:
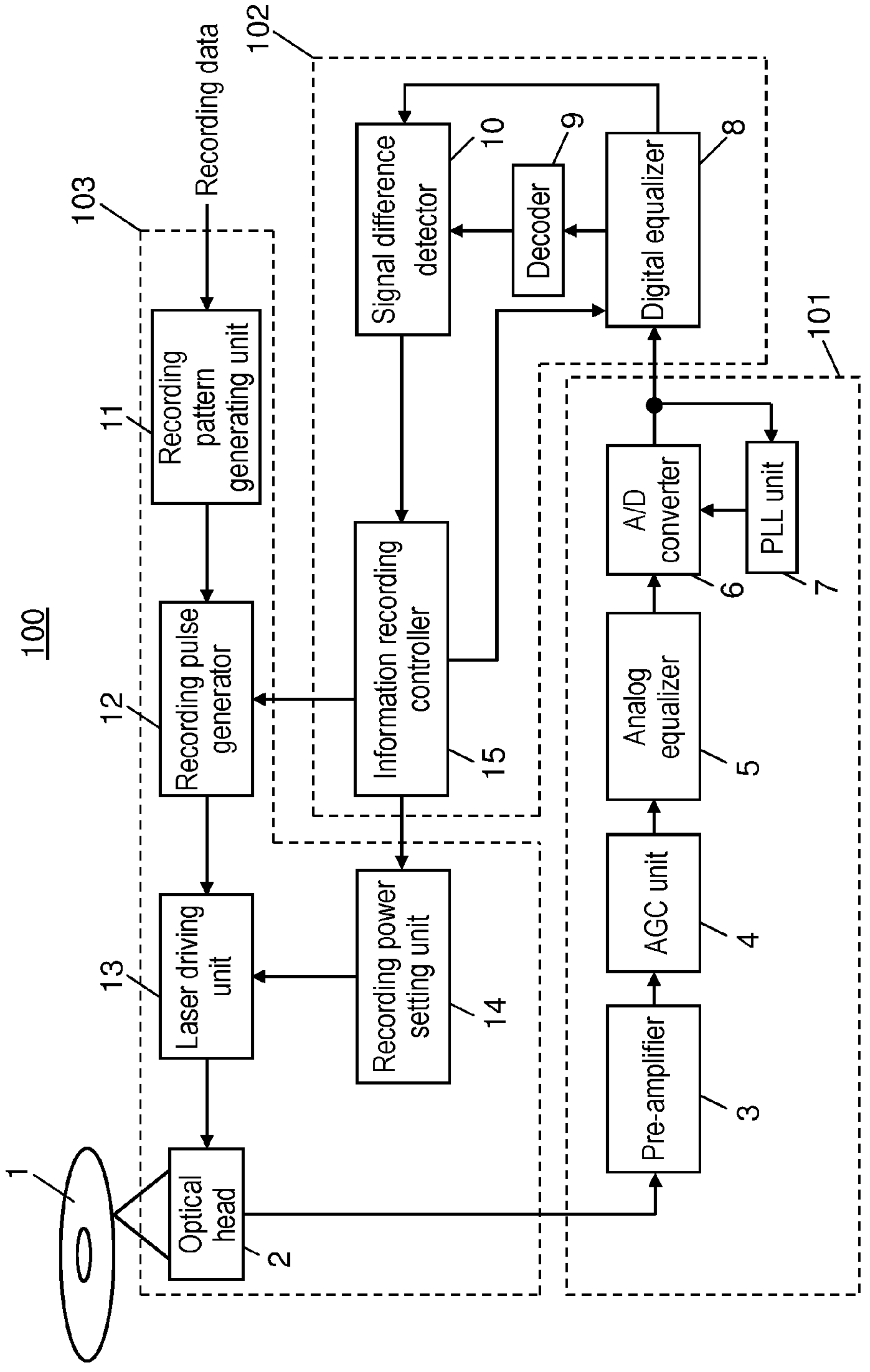
FIG. 1 is a diagram illustrating an information recording and reproducing apparatus according to a first exemplary embodiment.
Figure 2:
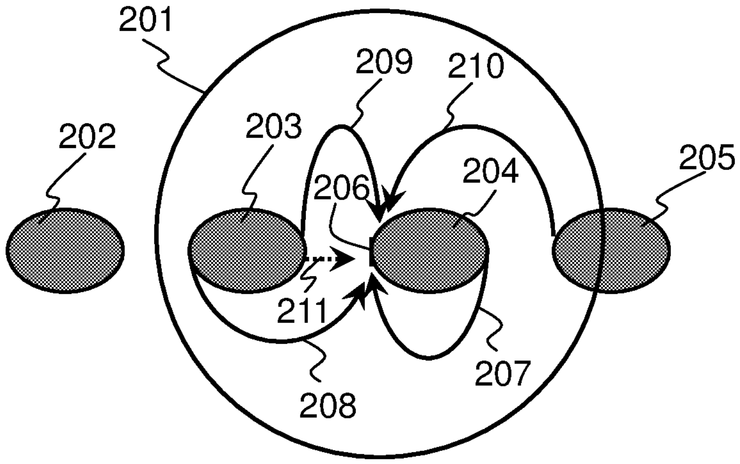
FIG. 2 is a diagram illustrating interference between edge shifts of edge portions of a recording mark.

FIG. 1 is a diagram illustrating information recording and reproducing apparatus 100 according to the first exemplary embodiment. Information recording and reproducing apparatus 100 includes reproducing unit 101, recording compensation unit 102, and recording unit 103.

Reproducing unit 101 includes pre-amplifier 3, AGC (Automatic Gain Control) unit 4, analog equalizer 5, A/D (Analog/Digital) converter 6, and PLL (Phase-Locked Loop) unit 7.

Recording compensation unit 102 includes digital equalizer 8, decoder 9, signal difference detector 10, and information recording controller 15.

Recording unit 103 includes optical head 2, recording pattern generating unit 11, recording pulse generator 12, laser driving unit 13, and recording power setting unit 14.

Information recording and reproducing apparatus 100 records information in information recording medium 1 and reproduces the recorded information. Information recording medium 1 is an information recording medium to which recording and reproducing of information is optically performed, and example of the medium include an optical disk.

Optical head 2 causes laser light that has passed an objective lens that is not depicted to be converged to the recording layer of information recording medium 1, receives the reflecting light, and generates a reproduced signal indicating the information recorded in information recording medium 1. For example, numerical aperture NA of the objective lens is in a range from 0.84 to 0.86, and more preferably 0.85. A wavelength of the laser light is in a range from 400 nm to 410 nm, and more preferably 405 nm.

Pre-amplifier 3 amplifies the reproduced signal with a predetermined gain and outputs the amplified signal to AGC unit 4.

AGC unit 4 uses a target gain that is previously determined to amplify the reproduced signal such that the reproduced signal output from A/D converter 6 has a constant level, and outputs the amplified reproduced signal to analog equalizer 5.

Analog equalizer 5 has an LPF (Low-Pass Filter) characteristic for cutting a high frequency in the reproduced signal, and a filter characteristic for amplifying a predetermined frequency band in the reproduced signal, performs waveform equalization to a reproduce waveform so as to have the desired characteristic and outputs the waveform to the A/D converter 6.

PLL unit 7 generates a reproducing clock in synchronization with the reproduced signal after the waveform equalization, and outputs the reproduction clock to A/D converter 6.

A/D converter 6 samples the reproduced signal in synchronization with the reproduction clock output from PLL unit 7, converts an analog signal to a digital signal, and outputs the converted signal to PLL unit 7 and digital equalizer 8.

Digital equalizer 8 adjusts a frequency of the reproduced signal such that a frequency characteristic of the reproduced signal during recording and reproducing becomes a frequency characteristic that has been previously determined, examples of which include the MTF characteristic according to the recording density and the PR equalization characteristic.

Decoder 9 decodes the reproduced signal that has been output from digital equalizer 8 and subjected to waveform equalization to generate a binary signal. Decoder 9 performs decoding using a Viterbi algorithm or using a BCJR (Bahl-Cocke-Jelinek-Raviv) algorithm, for example.

Signal difference detector 10 receives the reproduced signal that has been output from digital equalizer 8 and subjected to waveform equalization, and the binary signal output from decoder 9.

Signal difference detector 10 generates an expectation signal from the binary signal and the frequency characteristic used as the target in the waveform equalization by digital equalizer 8. Signal difference detector 10 detects a signal difference between the reproduced signal and the expectation signal.

Information recording controller 15 controls components of the information recording and reproducing apparatus such as reproducing unit 101, recording compensation unit 102, recording unit 103, and a servo controller that is not depicted in order to adjust recording pulse condition. Further, information recording controller 15 controls selection of the recording pattern and an operation of recording and reproducing when the recording pulse condition is adjusted.

Information recording controller 15 controls recording unit 103 so as to record recording data in information recording medium 1, the recording data including at least one recording mark or space in the recording density beyond the optical resolution determined by the wavelength and numerical aperture NA of the laser light as the optical condition of optical head 2. For example, assuming that the wavelength of the laser light is 405 nm and numerical aperture NA is 0.85, the shortest mark or the shortest space length is shorter than 119.1 nm.

Further, information recording controller 15 sets an optimal equalization characteristic, such as the PR equalization characteristic, depending on the length of the recording mark that has been set to digital equalizer 8.

Information recording controller 15 receives the signal difference output from signal difference detector 10. Information recording controller 15 performs the operation of recording and reproducing of the recording data to information recording medium 1 using a plurality of recording conditions. Then, information recording controller 15 compares a signal difference measured for each of the recording conditions with a target value recorded in information recording controller 15, and determines a recording condition closest to the target value. The target value is 0, for example. Information recording controller 15 is an optical disk controller, for example.

Recording pattern generating unit 11 generates an NRZI signal to be the recording pattern from the recording data that has been input.

Recording pulse generator 12 generates a recording pulse string according to the NRZI signal based on a recording parameter that is changed by information recording controller 15.

Recording power setting unit 14 sets recording power for each of peak power Pp, bottom power Pb, and the like.

Laser driving unit 13 controls an operation of laser emission of optical head 2 according to the recording pulse string generated by recording pulse generator 12 and the recording power set by recording power setting unit 14.

Figure 10A:
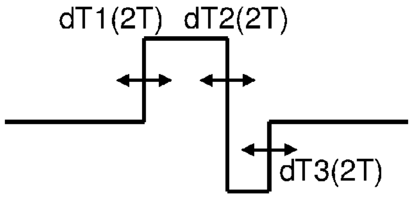
FIG. 10A is a diagram illustrating a recording pulse when recording compensation of recording mark 2T is performed in the first exemplary embodiment.

Next, a recording pulse for performing recording compensation according to the first exemplary embodiment will be described. FIG. 10A is a diagram illustrating a recording pulse when recording compensation of recording mark 2T is performed in this exemplary embodiment, and FIG. 10B is a diagram illustrating a recording pulse when recording compensation of recording mark 4T is performed in the first exemplary embodiment.

In FIG. 10A, dT1 (2T) is a parameter for changing the leading edge of the recording mark, and dT2 (2T) and dT3 (2T) are parameters for changing the trailing edges of the recording mark. In FIG. 10B, leading pulse dT1 (4T) is a parameter for changing the leading edge of the recording mark, and ending pulses dT2 (4T) and dT3 (4T) are parameters for changing the trailing edges of the recording mark.

In FIG. 10A, when the length of the recording mark is changed for recording mark 2T, a direction for changing dT1 (2T) and a direction for changing dT2 (2T) and dT3 (2T) are set in opposite directions. With this, the length of the recording pulse changes, and thus the length of the recording mark to be recorded also changes. Further, when the phase of the recording mark is changed for recording mark 2T, a direction for changing dT1 (2T) and a direction for changing dT2 (2T) and dT3 (2T) are set in the same direction. With this, the recording pulse changes in the same direction as a whole, and thus the phase of the recording mark to be recorded also changes.

Figure 10B:
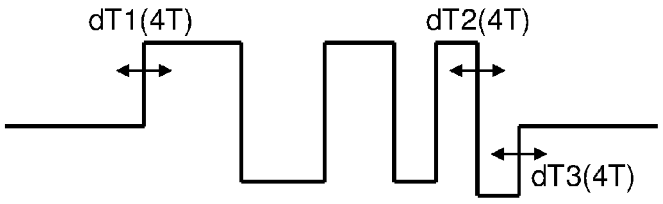
FIG. 10B is a diagram illustrating a recording pulse when recording compensation of recording mark 4T is performed in the first exemplary embodiment.

In FIG. 10B, when the length of the recording mark is changed for recording mark 4T, a direction for changing dT1 (4T) and a direction for changing dT2 (4T) and dT3 (4T) are set in opposite directions. With this, the length of the recording pulse changes, and thus the length of the recording mark to be recorded also changes. In the recording pulse in FIG. 10B, the recording pulse for dT1 (4T) and the recording pulse for dT2 (4T) are set as different recording pulses, dT1 (4T) may be changed separately from dT2 (4T) and dT3 (4T). Further, when the phase of the recording mark is changed for recording mark 4T in FIG. 10B, a direction for changing dT1 (4T) and a direction for changing dT2 (4T) and dT3 (4T) are set in the same direction. Unlike the recording pulse in FIG. 10A, only a leading pulse and an ending pulse are set in FIG. 10B, and therefore it is not possible to change the recording pulse as a whole including an intermediate pulse in the same direction, but the phase changes since the leading edge and the trailing edge of the recording mark to be recorded are changed in the same direction. It is desirable to change the recording pulse in FIG. 10B entirely in the same direction, if hardware of information recording and reproducing apparatus 100 is able to set to all recording pulses.

It should be noted that in the description with reference to FIG. 10B, only a rising edge is changed at the leading pulse, but the position of the leading pulse may be changed and the leading edge of the recording mark may be changed. Similarly, while only a falling edge is changed at the ending pulse, the position of the ending pulse may be changed and the trailing edge of the recording mark may be changed.

Figure 11:
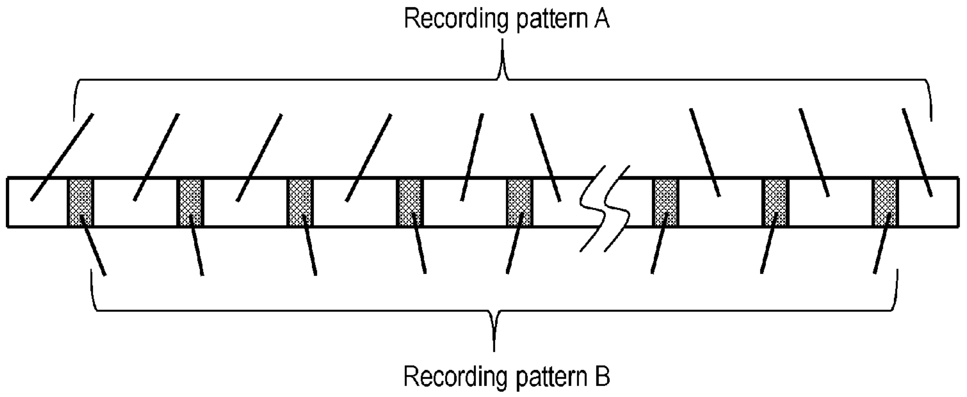
FIG. 11 is a diagram illustrating one example of recording data used in the recording compensation according to the first exemplary embodiment.

FIG. 11 is a diagram illustrating one example of recording data used in recording compensation according to the first exemplary embodiment. In FIG. 11, recording pattern A and recording pattern B are shown.

Recording pattern A is set as a recording pattern to which PLL control or DC control is easily performed. Examples of recording pattern A include a single signal and a specific recording data that appears only for a limited length, such as a random signal including 5T-8T. Recording pattern A may show a different recording pattern every time.

Recording pattern B is set as a specific recording pattern with which recording compensation is performed. Therefore, in order that PLL control or DC control may not be unstable, it is desirable that recording pattern A and recording pattern B are positioned alternately as shown in FIG. 11, instead of positioning recording pattern B continuously. Further, recording pattern B is set as the same recording pattern every time. In a case in which more than one recording mark is subjected to recording compensation at the same time, recording pattern B may show a different recording pattern every time.

Figure 12A:
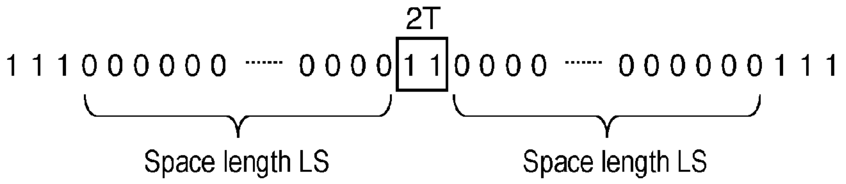
FIG. 12A is a diagram illustrating a binary signal when recording mark 2T in recording pattern B in FIG. 11 is an isolated mark.
Figure 12B:
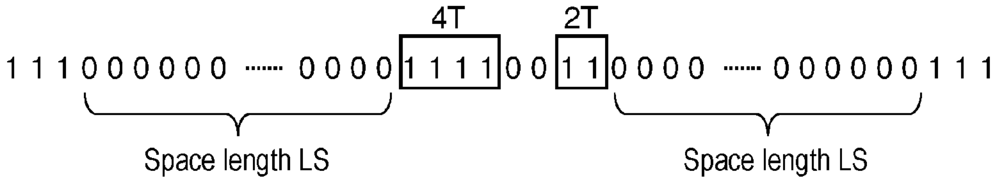
FIG. 12B is a diagram illustrating a binary signal when recording mark 4T is located before recording mark 2T in recording pattern B in FIG. 11.

Referring to FIG. 12A and FIG. 12B, recording pattern B is described in detail. Each of FIG. 12A and FIG. 12B shows a binary signal of an NRZI signal in recording pattern B, and recording mark of which recording compensation is performed is 2T.

FIG. 12A is a diagram illustrating the binary signal when recording mark 2T is an isolated mark. The recording pattern in FIG. 12A is used when recording compensation is performed to the recording condition of recording mark 2T. By recording the recording pattern in FIG. 12A, it is possible to form the recording mark as described with reference to FIG. 5.

In FIG. 12A, spaces having space length LS are positioned before and after recording mark 2T. At this time, space length LS is a length with which mark 2T is not affected by intersymbol interference of the preceding recording mark and the succeeding recording mark. Space length LS is desirably determined by a physical length. For example, physical space length LS may be calculated by defining space length to be $(\lambda/(4\times NA))\times N$ (N is a positive real number), and by setting N to be a large value such as N=10. Where wavelength $\lambda$=405 nm, NA=0.85, and N=10, physical space length LS is about 1191 nm. Then, space length LS as the recording pattern is calculated by the physical length for every 1T set in the recording density. For example, in the recording density in which the physical length for every 1T is set to be 24 nm, space length LS as the recording pattern is 50T. In this manner, space length LS in the recording pattern may be determined.

It should be noted that space length LS in the recording pattern may be obtained by reproduced signal with which the recording data is actually recorded and reproduced. In this case, space length LS in the recording pattern is set to be a length such that reproduced signals in preceding space 503 and succeeding space 504 have a constant signal level in FIG. 5.

FIG. 12B is a diagram illustrating a binary signal when recording mark 4T is located before recording mark 2T. A preceding space of recording mark 2T is set to be 2T. The recording pattern in FIG. 12B is used when recording compensation is performed to the recording condition of recording mark 2T having preceding space 2T. By changing length 4T of preceding recording mark of recording mark 2T in FIG. 12B, it is possible to form the recording mark as described with reference to FIG. 8.

In FIG. 12B, a space having space length LS is positioned before recording mark 4T and after recording mark 2T, similarly to FIG. 12A.

It should be noted that in FIG. 12A and FIG. 12B, lengths LS of the preceding space and the succeeding space may be different as long as no intersymbol interference is included in this length.

Further, binary signals at the starting position and the ending position of recording pattern B in FIG. 12A and FIG. 12B may be determined according to connecting relation with recording pattern A. For example, as illustrated in FIG. 12A and FIG. 12B, by setting the starting position and the ending position in recording pattern B as recording marks 3T, and by setting the starting position and the ending position in recording pattern A as spaces, a boundary between recording pattern A and recording pattern B is recording mark 3T.

Figure 13:
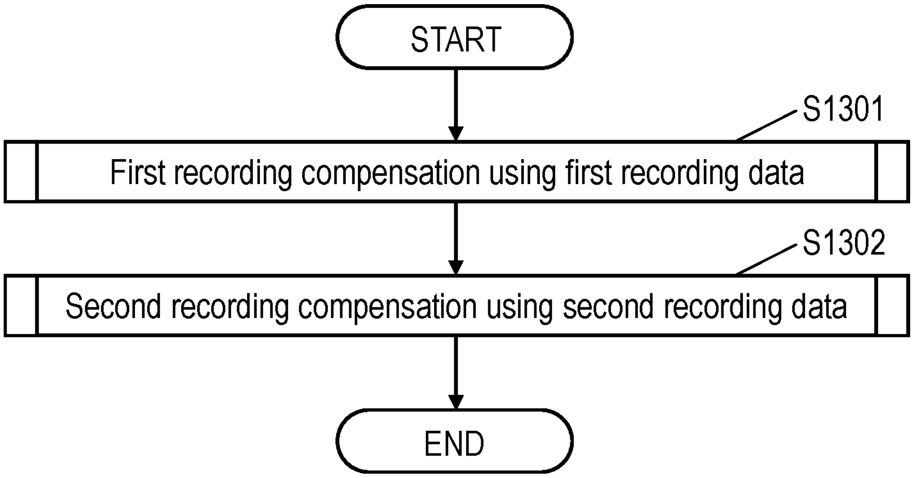
FIG. 13 is a flowchart of execution of recording compensation in the first exemplary embodiment.

FIG. 13 is a flowchart of execution of recording compensation in the first exemplary embodiment. Recording compensation according to the present disclosure is performed by performing first recording compensation using first recording data (S1301), and then performing second recording compensation using second recording data (S1302). Recording compensation will be described later in detail.

First recording data is recording data such that recording mark of which recording compensation is performed is an isolated mark as described with reference to FIG. 12A, and that the lengths of the preceding space and the succeeding space of the recording mark are set to be lengths that are not in intersymbol interference.

Second recording data is recording data, as described with reference to FIG. 12B, for changing a length of the second recording mark, while the second recording mark is located before or after the first recording mark of which the recording compensation is performed, and the length of the space between the first recording mark and the second recording mark to be constant. Further, in the second recording data, a length of a space adjacent to the first recording mark on a side opposite from the second recording mark, and a length of a space adjacent to the second recording mark on a side opposite from the first recording mark are set to be lengths that are not in intersymbol interference.

In S1301, recording compensation is performed to the recording pulse condition of each of the recording marks without an influence of different recording mark. Then, recording pulses of the recording marks have already been subjected to recording compensation by performing a step in S1302 after the step in S1301, even when the first recording mark and the second recording mark are in intersymbol interference.

In S1302, recording compensation to the recording pulse condition of the first recording mark may be performed for an influence of thermal interference generated by the second recording mark. With this, a recording pulse condition of the recording mark may be determined even for a length of a short space included in the modulation code when the information is actually recorded. Specifically, when the recording data is as shown in FIG. 12B, a recording pulse condition of recording mark 2T having preceding space 2T is determined. A recording pulse condition is similarly determined for a combination of a recording mark other than recording mark 2T and a space other than space 2T.

Further, in S1302, it is desirable to further change the recording pulse condition of the first recording mark and the second recording mark after recording compensation is performed to the recording pulse condition of the first recording mark of each of the recording marks, and to select a recording condition where a signal difference is closest to an index target value. With this, it is possible to reduce an influence of optical interference.

As described above, recording compensation may be performed to the edge shift of the recording mark even in a case of the recording density beyond optical resolution and large interference such as intersymbol interference and thermal interference. As a result, recording with a reduced error rate of the recording information may be realized based on an appropriate recording condition, and it is possible to achieve a further stable high density recording and reproducing system.

Next, recording compensation to the recording pulse condition in steps S1301 and S1302 will be described with reference to FIG. 14.

Figure 14:
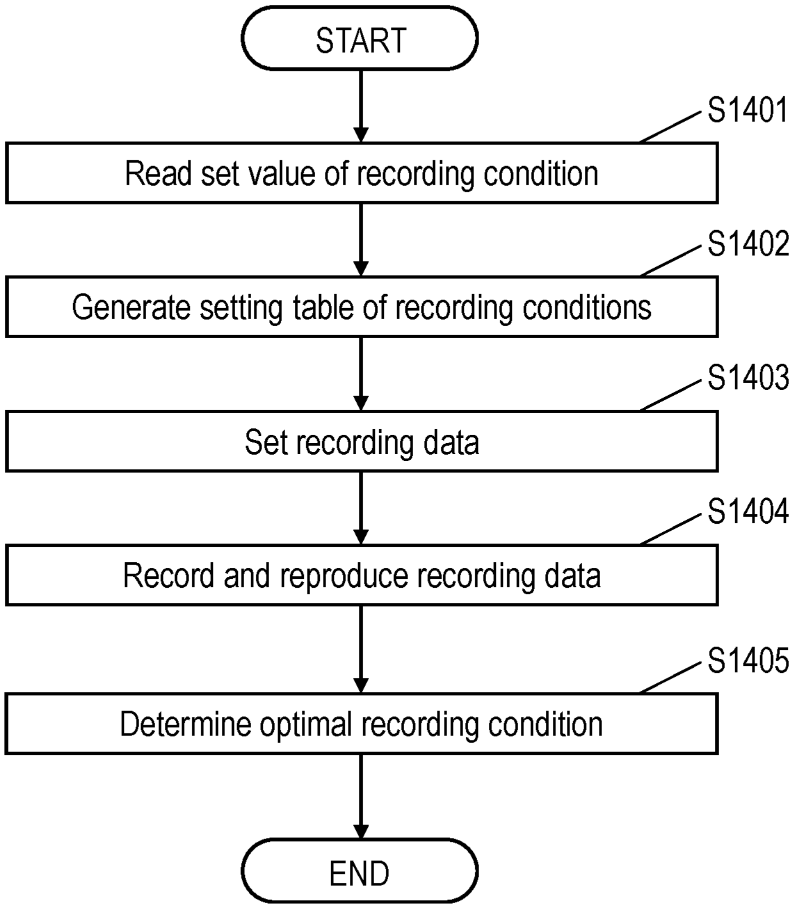
FIG. 14 is a flowchart of execution of recording compensation in each of steps in FIG. 13.

FIG. 14 is a flowchart of execution of recording compensation in each of steps in FIG. 13. The recording compensation here is performed to information recording medium 1 by information recording and reproducing apparatus 100.

(S1401) A set value for the recording condition is read. Information recording and reproducing apparatus 100 reads information relating to the recording power and the recording pulse condition recorded within information recording medium 1 or in information recording and reproducing apparatus 100 such as a memory as a recording parameter for an initial recording condition.

Here, the information recorded in information recording medium 1 is a value previously specified as the recording condition based on a result of evaluation of a recording characteristic of information recording medium 1 by a manufacturer when information recording medium 1 is manufactured. Further, examples of the information recorded in information recording medium 1 include values of the recording condition that have been recorded in the past to information recording medium 1 by information recording and reproducing apparatus 100 in an area for recording information unique to the device. Further, the information recorded in information recording and reproducing apparatus 100 is a value previously specified as the recording condition based on a result of evaluation of a recording characteristic of the apparatus by a manufacturer when the apparatus is manufactured. Further, a value recording history information of the recording condition that has been used to the information recording medium by the information recording and reproducing apparatus is also included. The recording power and the recording pulse condition are set values relating to the recording power and the recording pulse described with reference to FIG. 3.

(S1402) Next, a setting table of recording conditions is generated. Information recording controller 15 generates the setting table of recording conditions that is used when predetermined recording data is recorded for a plurality of recording conditions.

The setting table of recording conditions is a table for changing recording parameters. For example, when the length of recording mark 2T is adjusted, according to the recording condition table, information recording controller 15 offsets recording parameter dT1 (2T) at the leading edge in the range from −4 step to +4 step at an interval of 1 step, and offsets recording parameters dT2 (2T) and dT3 (2T) at the trailing edges in the range from +4 step to −4 at an interval of 1 step.

For example, when the phase of recording mark 2T is adjusted, according to the recording condition table, information recording controller 15 offsets recording parameters dT1 (2T), dT2 (2T), and dT3 (2T) at the leading and trailing edges in the range from −8 step to +8 step at an interval of 2 step.

It should be noted that when the length of the recording mark is adjusted, the leading edge or the trailing edge may be changed individually.

Here, 1 step is a unit obtained by, for example, dividing a cycle T of a recording clock into 32 parts. If cycle T is 132 MHz, 1 step is about 237 ps. Further, 1 step may be set to a fixed value, for example, 250 ps.

(S1403) Next, the recording data of which recording compensation is performed is set. Information recording controller 15 specifies the recording data recorded in information recording medium 1 to recording pattern generating unit 11. It should be noted that the recording data may be generated every time a recording operation is performed. In order to reduce time for generating the recording data, it is more preferable to record the recording data that has been previously generated in information recording and reproducing apparatus 100.

The recording data is the recording data as described with reference to FIG. 11. Recording pattern generating unit 11 generates the NRZI signal based on the specified recording data. Recording pulse generator 12 generates a recording pulse string of a laser emission waveform based on a shape of the recording pulse of the recording parameter output from information recording controller 15 and the NRZI signal output from recording pattern generating unit 11.

Recording power setting unit 14 sets recording powers such as peak power Pp and bottom power Pb according to the initial recording condition of information recording controller 15.

(S1404) Next, the operation of recording and reproducing of the recording data is performed to information recording medium 1. Information recording controller 15 moves optical head 2 to the recording area in order to adjust the recording parameter. The recording area is, for example, a recording area for adjusting recording power and the recording pulse provided for an innermost area of information recording medium 1, and called a PCA (Power Calibration Area) region in a case of DVDs. Further, at a stage of manufacturing information recording medium 1 and information recording and reproducing apparatus 100, when the manufacturer evaluates a recording characteristic of information recording medium 1 or information recording and reproducing apparatus 100, a user data region for recording user data may be used.

Next, laser driving unit 13 controls an operation of laser emission of optical head 2 according to the recording pulse string generated by recording pulse generator 12 and the recording power set by recording power setting unit 14, and records the recording data by a predetermined recording length such as the length of a minimum recording unit or the length of an address unit, to a track in a recording area that is not depicted in information recording medium 1.

At this time, information recording controller 15 refers to the recording condition table generated in S1402 to control laser driving unit 13 such that laser driving unit 13 records the recording data with the recording condition being changed.

Then, information recording and reproducing apparatus 100 reproduces a track of the recording data recorded with a plurality of recording conditions. Optical head 2 generates the reproduced signal indicating the information read from information recording medium 1. The reproduced signal is amplified by pre-amplifier 3 for AC coupling, and then input to AGC unit 4. AGC unit 4 adjusts a gain such that an output from analog equalizer 5 in a succeeding stage has constant amplitude.

The reproduced signal output from AGC unit 4 is subjected to waveform equalization by analog equalizer 5. The reproduced signal to which waveform equalization is performed is output to A/D converter 6. A/D converter 6 samples the reproduced signal in synchronization with the reproduction clock output from PLL unit 7. PLL unit 7 extracts the reproduction clock from the reproduced signal that has been sampled by A/D converter 6.

The reproduced signal generated by sampling performed by A/D converter 6 is input to digital equalizer 8. Digital equalizer 8 performs waveform equalization to the reproduced signal.

Decoder 9 decodes the reproduced signal that has been output from digital equalizer 8 and subjected to waveform equalization to generate a binary signal.

Signal difference detector 10 receives the reproduced signal that has been output from digital equalizer 8 and subjected to waveform equalization, and the binary signal output from decoder 9.

Then, signal difference detector 10 obtains the signal difference between the reproduced signal and the expectation signal. The signal difference is output to information recording controller 15.

(S1305) Next, a final processing of the optimal recording condition is performed. Information recording controller 15 compares the signal difference for the plurality of recording conditions detected in S1404, with the index target value recorded in information recording controller 15, and selects the recording condition closest to the index target value.

In this manner, adjustment of the recording pulse condition by information recording and reproducing apparatus 100 is performed.

Second Exemplary Embodiment

Hereinafter, detection of an edge shift according to a second exemplary embodiment will be described. In the first exemplary embodiment, the description has been given of recording compensation to the edge shift of the recording mark after interference, such as intersymbol interference, optical interference, and thermal interference, is removed. The recording condition to which recording compensation is performed is converged to an optimal recording condition taking interference as a whole into consideration.

In the second exemplary embodiment, an edge shift is detected with which the optimal recording condition is directly obtained after symbol interference is removed.

In order to detect the edge shift, a binary signal as the recording data, a reproduced signal when the binary signal is recorded and reproduced, and an expectation signal are required. Here, similarly to the first exemplary embodiment, the expectation signal is obtained by convolution of the binary signal and a isolated waveform. Further, these signals are expressed as binary signal b(t), reproduced signal r(t), expectation signal e(t), isolated waveform f(t), and compensate signal rr(t).

First, a detection pattern of an edge for which an edge shift is desired to be detected is determined. In the second exemplary embodiment, the detection pattern is a combination of a preceding space and a recording mark corresponding to the mark of interest. Here, for example, a length of the preceding space may take four patterns of “2T”, “3T”, “4T”, and “5T or more”, a length of the mark of interest may take four patterns of “2T”, “3T”, “4T”, and “5T or more”, and a total number of combinations is 16. Each of the marks or the spaces includes two edges of a leading edge and a trailing edge, and thus a total number of the detection patterns is 32.

It should be noted that the detection patterns in the second exemplary embodiment are not limited to the combination of the preceding space and the mark of interest. For example, the detection pattern may be a combination of the mark of interest and a succeeding space. Alternatively, the detection pattern may be a combination of a preceding space, the mark of interest, and a succeeding space. Moreover, the detection pattern may be a combination of a preceding mark, a preceding space, and the mark of interest. Further, a length of the preceding space or the mark of interest is not limited to the four patterns of “2T”, “3T”, “4T”, and “5T or more”. In addition, the length of the preceding space and the length of the mark of interest may be different. For example, the length of the preceding space may be five patterns of “2T”, “3T”, “4T”, “5T”, and “6T or more”, and the length of the mark of interest may be seven patterns of “2T”, “3T”, “4T”, “5T”, “6T”, “7T”, and “8T”.

Next, a signal difference between reproduced signal r(t) at an edge portion and expectation signal e(t) in the detection pattern is calculated, and an average signal difference is detected. By averaging the signal difference, variation in the detection may be reduced. It should be noted that the signal difference is detected for all of the detection patterns.

Here, an edge shift to be detected for the detection pattern, and the signal difference will be described. FIG. 16A shows edge shift X at the leading edge in the detection pattern. FIG. 16B shows edge shift X at the trailing edge in the detection pattern. The total number of detection patterns is 32, and edge shifts X1-X16 at the leading edge in the detection pattern and edge shifts X17-X32 at the trailing edge in the detection pattern are detected.

FIG. 17A shows signal difference Y at the leading edge in the detection pattern. FIG. 17B shows signal difference Y at the trailing edge in the detection pattern. As the total number of detection patterns is 32, signal differences Y1-Y16 at the leading edge in the detection pattern and signal differences Y17-Y32 at the trailing edge in the detection pattern are detected.

At this time, a conversion equation between edge shift X and signal difference Y to the detection patterns is expressed by Expression 1.

$$\begin{bmatrix} Y1 \\ Y2 \\ \vdots \\ Y31 \\ Y32 \end{bmatrix} = \begin{bmatrix} A(1,1) & A(2,1) & \dots & A(32,1) \\ A(1,2) & A(2,2) & \dots & A(32,2) \\ \vdots & \vdots & \dots & \vdots \\ A(1,31) & A(2,31) & \dots & A(32,31) \\ A(1,32) & A(2,32) & \dots & A(32,32) \end{bmatrix} \begin{bmatrix} X1 \\ X2 \\ \vdots \\ X31 \\ X32 \end{bmatrix} \quad \text{Expression 1}$$

Expression 1 is expressed by a matrix of edge shift X, a matrix of signal difference Y, and a matrix of conversion coefficient A. In Expression 1, the matrix of conversion coefficient A expresses a magnitude of influence of each of the edge shifts interfering to other edges. Therefore, the matrix of conversion coefficient A is a square matrix of the total number of combinations of the detection patterns.

As described above, the signal difference may be obtained by the reproduced signal and the expectation signal. Therefore, by obtaining the matrix of conversion coefficient A, the matrix of edge shift X may also be obtained.

Here, a method for obtaining the matrix of conversion coefficient A is described. First, a binary signal corresponding to an edge portion for one detection pattern is intentionally changed by predetermined amount ΔT. Specifically, edge shift X changes by ΔT. Predetermined amount ΔT is, for example, 0.2T, but may be longer or shorter than 0.2T.

Next, amount of change Δf(t) of a isolated waveform with respect to the change in predetermined amount ΔT is calculated. Amount of change Δf(t) of the isolated waveform is calculated by f(t)×ΔT.

Further, amount of change Δf(t) of the isolated waveform is added to the detection pattern for reproduced signal r(t), and signal difference YY is detected again based on the added signal and the expectation signal. Based on a difference between signal difference YY and signal difference Y, and predetermined amount ΔT, it is possible to obtain conversion coefficient A relating to an edge portion for one detection pattern. Conversion coefficient A relating to another detection pattern may also be obtained in a similar manner.

As one example, a method of obtaining the matrix of conversion coefficient A relating to edge shift X1 using Expression 1 is described. As described above, by changing edge shift X1 in Expression 1 by ΔT, Expression 2 is obtained. In Expression 2, signal difference YY is a signal difference that is detected again based on the signal obtained by adding amount of change Δf(t) of the isolated waveform to reproduced signal r(t) and the expectation signal.

$$\begin{bmatrix} YY1 \\ YY2 \\ \vdots \\ YY31 \\ YY32 \end{bmatrix} = \begin{bmatrix} A(1,1) & A(2,1) & \ldots & A(32,1) \\ A(1,2) & A(2,2) & \ldots & A(32,2) \\ \vdots & \vdots & \ldots & \vdots \\ A(1,31) & A(2,31) & \ldots & A(32,31) \\ A(1,32) & A(2,32) & \ldots & A(32,32) \end{bmatrix} \begin{bmatrix} X1+\Delta T \\ X2 \\ \vdots \\ X31 \\ X32 \end{bmatrix} \quad \text{Expression 2}$$

At this time, based on a difference between Expression 2 and Expression 1, Expression 3 is obtained.

$$\begin{bmatrix} YY1-Y1 \\ YY2-Y2 \\ \vdots \\ YY31-Y31 \\ YY32-Y32 \end{bmatrix} = \Delta T \begin{bmatrix} A(1,1) \\ A(1,2) \\ \vdots \\ A(1,31) \\ A(1,32) \end{bmatrix} \quad \text{Expression 3}$$

Using Expression 3, it is possible to obtain the matrix of conversion coefficient A relating to edge shift X1. Specifically, the matrix of conversion coefficient A relating to edge shift X1 may be obtained by dividing a difference between the matrix of signal difference Y and the matrix of signal difference YY by predetermined amount ΔT. Elements of the matrix of conversion coefficient A relating to edge shift X1 are A(1, 1) to A(1, 32) shown in Expression 3.

Similarly, elements of the matrix of conversion coefficient A relating to edge shifts X2-X32 may also be obtained. In this manner, all of the elements of the matrix of conversion coefficient A may be obtained.

Once the matrix of conversion coefficient A is obtained, the matrix of edge shift X may be obtained based on an inverse matrix of conversion coefficient A in Expression 1.

Figure 18:
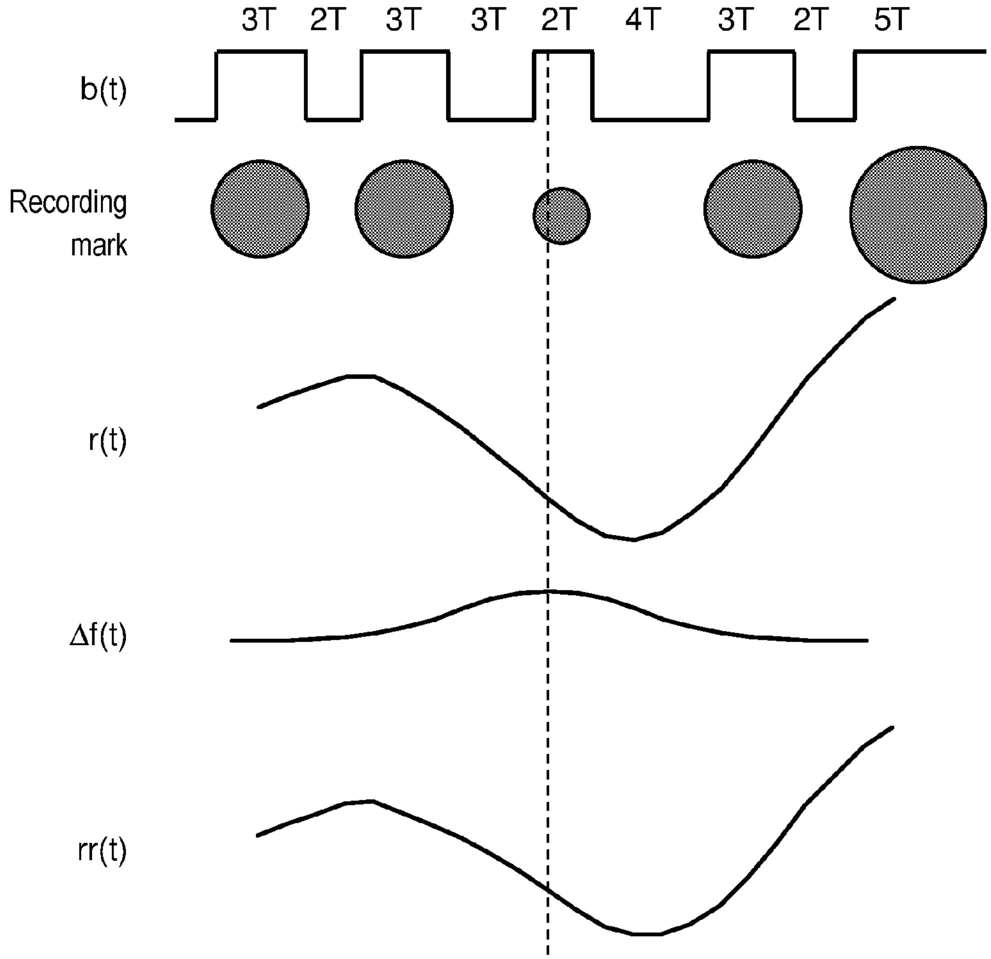
FIG. 18 is a diagram illustrating addition of an amount of change in a isolated waveform of a specific edge portion of the reproduced signal in the second exemplary embodiment.

Further, addition of amount of change Δf(t) of the isolated waveform to reproduced signal r(t) will be described with reference to FIG. 18. FIG. 18 is a diagram illustrating the addition of amount of change Δf(t) of the isolated waveform of a specific edge portion to reproduced signal r(t).

FIG. 18 shows, in order from the top, binary signal b(t) of the NRZI signal as a recording signal, a recording mark when binary signal b(t) is recorded in information recording medium 1, reproduced signal r(t) obtained by recording mark, amount of change Δf(t) of the isolated waveform, and compensate signal rr(t) obtained by adding reproduced signal r(t) and amount of change Δf(t) of isolated waveform.

Further, reproduced signal r(t), amount of change Δf(t) of the isolated waveform, and compensate signal rr(t) change the signal in an upward direction due to the recording mark.

In FIG. 18, indicated by a dashed line is a specific edge portion of the recording mark that is desired to be detected, and is a leading edge having preceding space 3T and recording mark 2T.

Here, a case is considered in which the leading edge of recording mark 2T having preceding space 3T changes by predetermined amount ΔT to a side on which the recording mark increases. At this time, from relation of convolution of isolated waveform f(t) of binary signal b(t), amount of change Δf(t) of the isolated waveform in FIG. 18 is calculated by f(t)×ΔT. Amount of change Δf(t) of the isolated waveform is an estimated amount by which reproduced signal r(t) changes when the leading edge is changed by ΔT.

Therefore, by adding amount of change Δf(t) of the isolated waveform to reproduced signal r(t) in FIG. 18 at the leading edge of mark 2T having preceding space 3T, compensate signal rr(t) may be obtained.

Then, for change ΔT in the leading edge of recording mark 2T having preceding space 3T, signal difference Y between reproduced signal r(t) and expectation signal e(t), and signal difference YY between compensate signal rr(t) and expectation signal e(t) can be obtained for each of the detection patterns.

As a result, it is possible to obtain the elements of the matrix of conversion coefficient A relating to the leading edge of mark 2T having preceding space 3T using Expression 3.

Similarly, it is possible to obtain the elements of the matrix of conversion coefficient A for another detection pattern other than the leading edge of recording mark 2T having preceding space 3T.

In order to facilitate the description relating to amount of change Δf(t) of the isolated waveform, amount of change Δf(t) of the isolated waveform is calculated by f(t)×ΔT. This obtains amount of change Δf(t) of the isolated waveform for a center of 1T. In fact, a starting point of the recording mark changes if the edge of the recording mark changes. Therefore, it is more preferable to perform calculation by changing a phase of amount of change Δf(t) of the isolated waveform by ΔT corresponding to change ΔT of the edge of the recording mark. As a result, it is possible to obtain compensate signal rr(t) more accurately.

It should be noted that as compensate signal rr(t), it is possible to use the reproduced signal that has been recorded and reproduced by actually changing the condition of the recording pulse by ΔT, instead of calculation by amount of change Δf(t) of the isolated waveform.

In this manner, by changing the signal difference for each of the edge portions sequentially, it is possible to finally detect the edge shift for each of the detection patterns.

Figure 15:
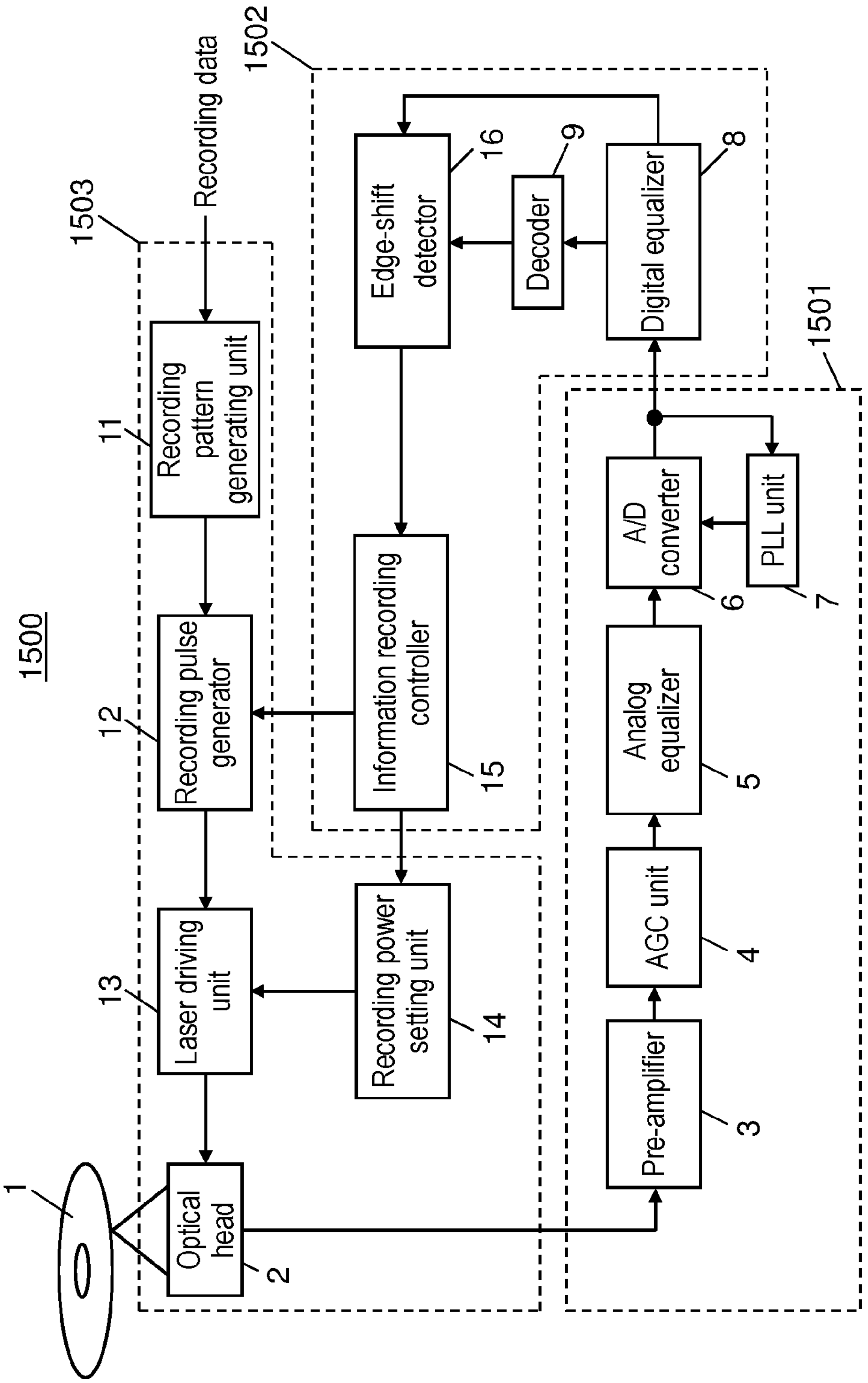
FIG. 15 is a diagram illustrating an information recording and reproducing apparatus according to a second exemplary embodiment.

FIG. 15 is a diagram illustrating information recording and reproducing apparatus 1500 according to the second exemplary embodiment. Information recording and reproducing apparatus 1500 includes reproducing unit 1501, recording compensation unit 1502, and recording unit 1503.

Reproducing unit 1501 includes pre-amplifier 3, AGC unit 4, analog equalizer 5, A/D converter 6, and PLL unit 7.

Recording compensation unit 1502 includes digital equalizer 8, decoder 9, edge-shift detector 16, and information recording controller 15.

Recording unit 1503 includes optical head 2, recording pattern generating unit 11, recording pulse generator 12, laser driving unit 13, and recording power setting unit 14.

Specifically, reproducing unit 1501 is the same as reproducing unit 101 of information recording and reproducing apparatus 100. Further, as compared to recording compensation unit 102 of information recording and reproducing apparatus 100, recording compensation unit 1502 is modified such that signal difference detector 10 is replaced by edge-shift detector 16. Moreover, recording unit 1503 is the same as recording unit 103 of information recording and reproducing apparatus 100. Therefore, in the second exemplary embodiment, edge-shift detector 16 is described.

Figure 19:
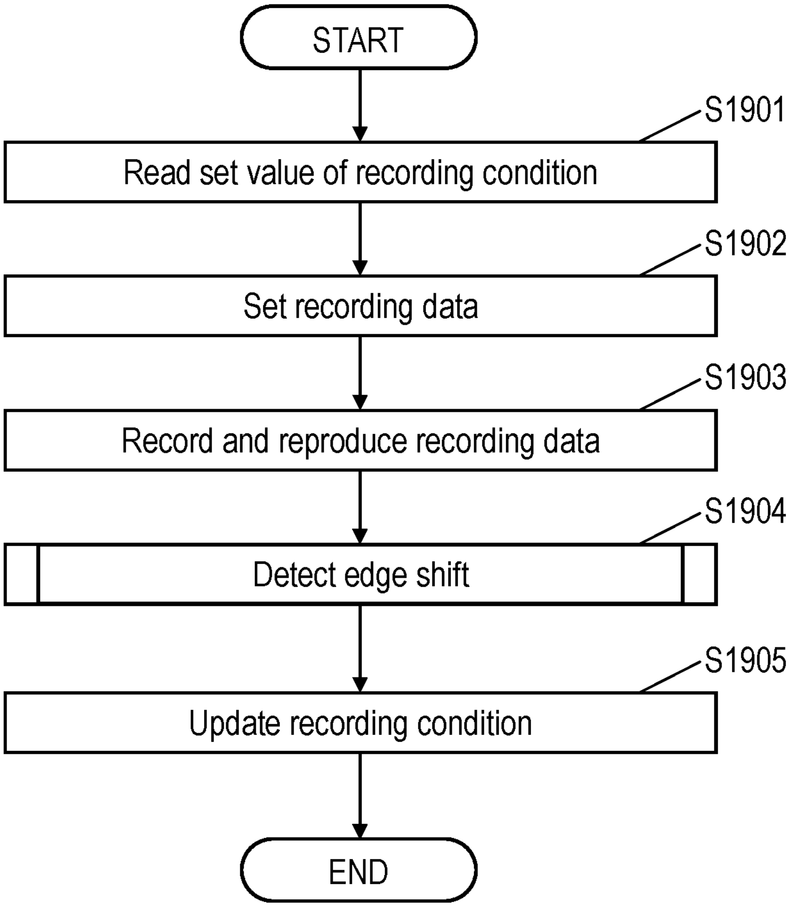
FIG. 19 is a flowchart of execution of recording compensation under a recording pulse condition according to the second exemplary embodiment.

An operation of information recording and reproducing apparatus 1500 will be described. In the second exemplary embodiment, the change of the recording pulse is assumed to be the same as shown in FIG. 10A and FIG. 10B. FIG. 19 is a flowchart of execution of recording compensation to the recording pulse condition in information recording and reproducing apparatus 1500.

(S1901) First, A set value for the recording condition is read. S1901 is the same as S1401 in FIG. 14 according to the first exemplary embodiment.

(S1902) Next, the recording data of which recording compensation is performed is set. S1902 is the same as S1403 in FIG. 14 according to the first exemplary embodiment. However, the recording data to be used is different.

In the first exemplary embodiment, recording compensation is performed using different recording data. In the second exemplary embodiment, recording compensation is performed in which the optimal recording condition is directly obtained using one piece of recording data. Therefore, recording compensation according to the second exemplary embodiment is required to use the recording data that includes all of the detection patterns. For example, the recording data in the second exemplary embodiment is a random signal that includes all of the detection patterns. Further, in order to avoid biased appearance of the detection patterns, it is more desirable that appearance of the detection patterns in the recording data is substantially equal.

It should be noted that it is only necessary to use the recording data corresponding to the detection patterns, and it is possible to use a plurality of pieces of recording data corresponding to variation in the detection patterns.

(S1903) An operation of recording and reproducing of the recording data is performed to information recording medium 1. Information recording controller 15 moves optical head 2 to the recording area for adjusting a recording parameter.

Laser driving unit 13 controls an operation of laser emission of optical head 2 according to the recording pulse string generated by recording pulse generator 12 and the recording power set by recording power setting unit 14, and records the recording data by a predetermined recording length such as the length of a minimum recording unit or the length of an address unit, to a track in a recording area that is not depicted in information recording medium 1. Then, information recording and reproducing apparatus 1500 reproduces a track of the recording data. Optical head 2 generates the reproduced signal indicating the information read from information recording medium 1. Reproducing unit 1501 outputs the reproduced signal as the reproduced signal. Recording compensation unit 1502 receives the reproduced signal. Digital equalizer 8 performs waveform equalization to the reproduced signal. Decoder 9 decodes the reproduced signal that has been output from digital equalizer 8 and subjected to waveform equalization to generate a binary signal.

(S1904) Next, an edge shift is detected. Edge-shift detector 16 receives the reproduced signal that has been output from digital equalizer 8 and subjected to waveform equalization, and the binary signal output from decoder 9.

Further, edge-shift detector 16 detects an edge shift as displacement of an edge based on the reproduced signal and the binary signal, and outputs the detected edge shift to information recording controller 15. An operation of edge-shift detector 16 will be described in detail later.

(S1905) Update of the recording condition is performed. Information recording controller 15 updates the recording condition based on the edge shift output from edge-shift detector 16.

For example, in FIG. 16A, in a case where the recording mark of edge shift X1 is displaced largely by 0.2T, a leading edge of the recording pulse having the preceding space 2T and the recording mark 2T is changed by 0.2T. Other edge shifts may be similarly set. It is more preferable to previously measure sensitivity indicating the change of the edge shift to the change of the edge in order to update the condition of the recording pulse accurately. This is because the recording sensitivity of information recording medium 1 is different depending on the medium. In this manner, it is possible to perform recording compensation to the recording condition corresponding to the detection pattern.

Figure 20:
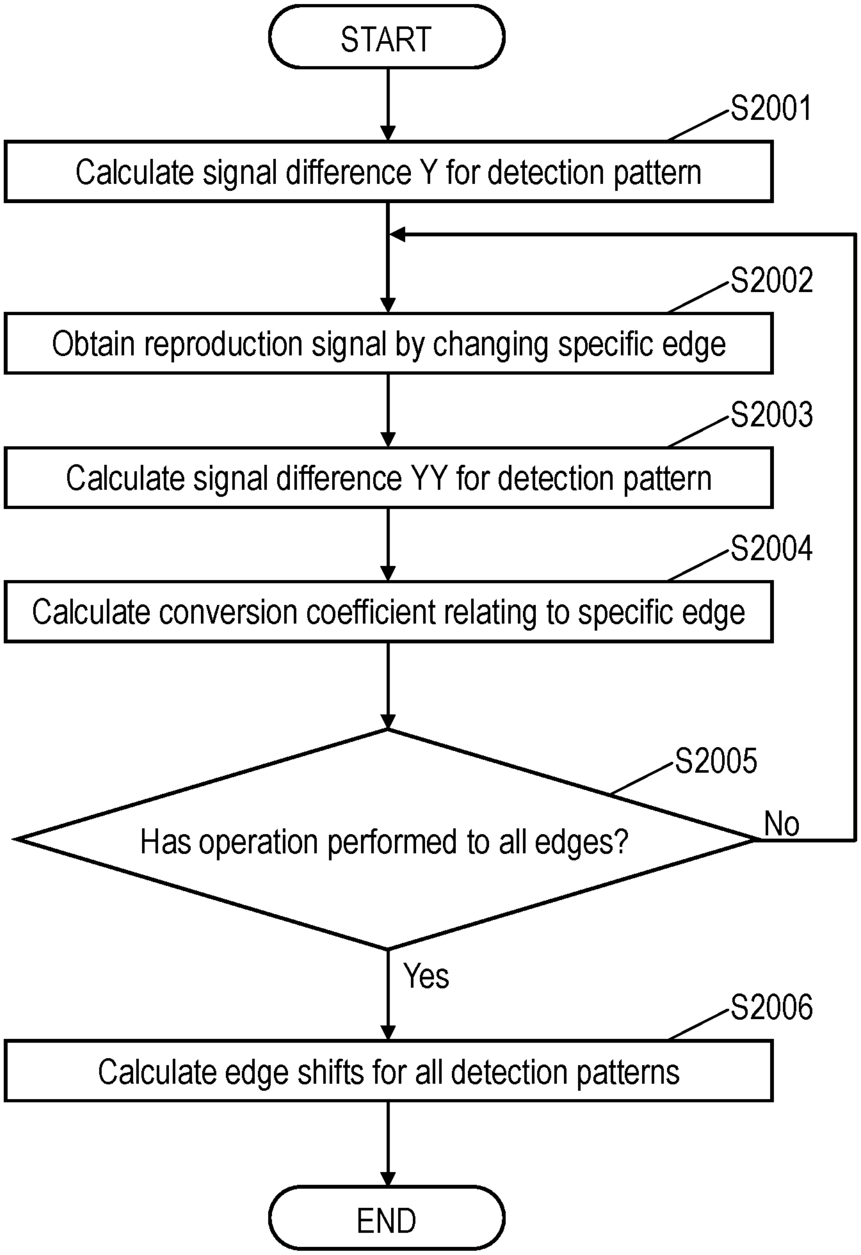
FIG. 20 is a flowchart for showing an operation of an edge-shift detector according to the second exemplary embodiment.

FIG. 20 is a flowchart for showing an operation of edge-shift detector 16.

(S2001) First, signal difference Y for the detection pattern is calculated. Edge-shift detector 16 receives the reproduced signal that has been output from digital equalizer 8 and subjected to waveform equalization, and the binary signal output from decoder 9. Edge-shift detector 16 generates an expectation signal from the binary signal and the frequency characteristic used as the target in the waveform equalization by digital equalizer 8. Edge-shift detector 16 detects a signal difference between the reproduced signal and the expectation signal. Signal difference Y in the second exemplary embodiment is a difference between the reproduced signal at the edge portion of the recording mark and the expectation signal.

Edge-shift detector 16 calculates the signal difference for each of the detection patterns. At this time, a matrix operation is required in arithmetic processing that will be later described, and signal difference Y calculated for each of the detection patterns is expressed in a matrix. With this, a matrix corresponding to a left side in Expression 1 is obtained. Here, the reproduced signal in S2001 is taken as a first reproduced signal. Further, a matrix obtained in S2001 is taken as a first matrix.

(S2002) Next, the reproduced signal is obtained based on the change of the specific edge. Then, edge-shift detector 16 obtains the reproduced signal when an edge for one detection pattern is changed by a predetermined amount. As described above, the reproduced signal in S2002 is obtained by adding the amount of change of the isolated waveform to the first reproduced signal. At this time, a position at which the amount of change of the isolated waveform is added to the first reproduced signal is the edge portion that has been changed by the predetermined amount. Further, the isolated waveform is a response characteristic for every 1T, and equal to a frequency characteristic as a target in the waveform equalization by digital equalizer 8.

The reproduced signal may be obtained in S2002 using a different method. For example, it is possible to use the reproduced signal reproduced by performing recording and reproducing in S1903 in FIG. 19 by actually changing the condition of the recording pulse by the predetermined amount. The reproduced signal in S2002 is taken as a second reproduced signal.

(S2003) Next, signal difference YY for the detection pattern is calculated. Edge-shift detector 16 detects signal difference YY between the second reproduced signal obtained in S2002 and the expectation signal. Edge-shift detector 16 calculates the signal difference for each of the detection patterns. At this time, since the matrix operation is required in the arithmetic processing that will be later described, signal difference YY calculated for each of the detection patterns is expressed in a matrix. With this, a matrix corresponding to a left side in Expression 2 is obtained. Here, a matrix obtained in S2003 is taken as a second matrix.

(S2004) Next, calculation of the conversion coefficient relating to the specific edge is performed. Edge-shift detector 16 calculates the conversion coefficient relating to the specific edge that has been changed in S2002, based on the first matrix obtained in S2001, the second matrix obtained in S2003, and the predetermined amount of change in S2002. Edge-shift detector 16 calculates an element of the matrix of the conversion coefficient using Expression 3. Specifically, the matrix of the conversion coefficient to the specific edge is calculated by dividing a difference between the first matrix and the second matrix by the predetermined amount. By Expression 3, elements of the matrix A(1, 1) to A(1, 32) are obtained. With this, it is possible to obtain the conversion coefficient relating to the specific edge.

(S2005) It is confirmed whether or not the conversion coefficient has been obtained for all edges. Specifically, edge-shift detector 16 confirms whether or not the conversion coefficient has been obtained for all edges of the detection patterns. If not obtained (No in S2005), the step in S2002 is performed to the edge to which the conversion coefficient has not been obtained. If obtained (Yes in S2005), the process proceeds to S2006.

Here, the flowchart may be configured such that S2002 to S2004 are performed sequentially to all of the edges of the detection patterns, instead of the step in S2005.

(S2006) The edge shifts for all of the detection patterns are calculated. Edge-shift detector 16 calculates the edge shift for all of the detection patterns, based on the first matrix obtained in S2001 and the matrix of the conversion coefficient obtained in S2002-S2005. The edge shift may be calculated based on the first matrix and the inverse matrix of the conversion coefficient as shown by Expression 1.

In this manner, edge-shift detector 16 can detect the edge shift as displacement of the edge.

As described above, by changing a signal difference for the specific edge portion, and by detecting the amount of change of the edge shift at the edge portion that interferes, it is possible to estimate interference relation of the edge shift, and to detect the edge shift for each of the detection patterns eventually. Specifically, it is possible to perform recording compensation to the edge shift of the recording mark. With this, it is possible to form a recording mark without edge shift, and to perform recording with less error in reproduced signals as a whole.

In the second exemplary embodiment, it is described that information recording and reproducing apparatus 1500 includes reproducing unit 1501 and recording unit 1503 in order to describe the operation of recording and reproducing, but information recording and reproducing apparatus 1500 may include only recording compensation unit 1502. In this case, recording compensation unit 1502 is adopted as an edge shift detector configured to detect the edge shift from digitalized reproduced signal, and may be used as a device for evaluating the edge shift of the reproduced signal.

The detection pattern in the second exemplary embodiment includes a recording mark and a space length having a length of 5T or more. However, the detection patterns may be set for each of a recording mark and a space length having a length of 5T to a mark having maximum length.

It should be noted that the values for the wavelength of the laser light and numerical aperture NA of the objective lens are not limited to the above examples.

The processing steps in the exemplary embodiments may include an optional step and long as the above described steps may be performed. Further, the present disclosure may be a recording and reproducing program for executing functions of the information recording and reproducing apparatus according to the exemplary embodiments. Such a recording and reproducing program may be stored in a memory within the information recording and reproducing apparatus according to the exemplary embodiments. Alternatively, the recording and reproducing program may be stored in the memory within the information recording and reproducing apparatus after the information recording and reproducing apparatus has been shipped. For example, the recording and reproducing program may be stored in the memory within the information recording and reproducing apparatus by accessing the memory within the information recording and reproducing apparatus via the Internet. Alternatively, the information recording and reproducing apparatus may reproduce an information recording medium in which information of the recording and reproducing program is recorded to store the recording and reproducing program in the memory within the information recording and reproducing apparatus.

The present disclosure is applicable to information recording and reproducing apparatuses capable of recording and reproducing information to and from various information recording media in which data signals may be recorded using laser light or electromagnetic force. Specifically, the present disclosure is applicable to recorders and data archivers employing optical disk devices.

What is claimed is:

1. An information recording and reproducing apparatus comprising:

a reproducing unit configured to generate a digital signal from an analog signal as information recorded in an information recording medium;

a recording compensation unit configured to decode the digital signal into a binary signal, generate an expectation signal based on the binary signal, detect a signal difference between the digital signal and the expectation signal, and adjust a recording condition for recording information into the information recording medium based on the signal difference; and a recording unit configured to record the information into the information recording medium based on the recording condition, wherein the adjustment of the recording condition is performed by:

first recording compensation for adjusting the recording condition using first recording data having a length with which lengths of a preceding space and a succeeding space of a first recording mark and lengths of a preceding space and a succeeding space of a second recording mark are not in intersymbol interference; and second recording compensation for adjusting the recording condition for the first recording mark using second recording data for changing a length of the second recording mark, while the second recording mark of which the first recording compensation has been performed is located before or after the first recording mark of which the first recording compensation has been performed, and the length of the space between the first recording mark and the second recording mark to be constant.

2. The information recording and reproducing apparatus according to claim 1, wherein in the second recording data, a length of a space adjacent to the first recording mark on a side opposite from the second recording mark, and a length of a space adjacent to the second recording mark on a side opposite from the first recording mark are such that do not cause intersymbol interference.

3. An information recording and reproducing method comprising:

a reproducing step for generating a digital signal from an analog signal as information recorded in an information recording medium;

a recording compensation step for decoding the digital signal into a binary signal, generating an expectation signal based on the binary signal, detecting a signal difference between the digital signal and the expectation signal, and adjusting a recording condition for recording information into the information recording medium based on the signal difference; and a recording step for recording the information into the information recording medium based on the recording condition, wherein the adjustment of the recording condition is performed by:

first recording compensation for adjusting the recording condition using first recording data having a length with which lengths of a preceding space and a succeeding space of a first recording mark and lengths of a preceding space and a succeeding space of a second recording mark are not in intersymbol interference; and second recording compensation for adjusting the recording condition for the first recording mark using second recording data for changing a length of the second recording mark, while the second recording mark of which the first recording compensation has been performed is located before or after the first recording mark of which the first recording compensation has been performed, and the length of the space between the first recording mark and the second recording mark to be constant.

4. An information recording and reproducing apparatus comprising:

a reproducing unit configured to generate a digital signal from an analog signal as information recorded in an information recording medium;

a recording compensation unit configured to decode the digital signal into a binary signal, generate an expectation signal based on the binary signal, detect a signal difference between the digital signal and the expectation signal, and adjust a recording condition for recording information into the information recording medium based on the signal difference; and a recording unit configured to record the information into the information recording medium based on the recording condition, wherein the adjustment of the recording condition is performed by detecting an edge shift as displacement of an edge for each of detection patterns from the signal difference and performing recording compensation, the adjustment including:

detecting a first matrix obtained by calculating a signal difference between a first reproduced signal and the expectation signal for each of the detection patterns;

obtaining a second reproduced signal when an edge for each of the detection patterns is changed by a predetermined amount;

detecting a second matrix obtained by calculating a signal difference between the second reproduced signal and the expectation signal for each of the detection patterns;

calculating a matrix of a conversion coefficient to the edge by dividing a difference between the first matrix and the second matrix by the predetermined amount; and calculating an edge shift based on the first matrix and an inverse matrix of the conversion coefficient.

5. The information recording and reproducing apparatus according to claim 4, wherein the matrix of the conversion coefficient is a square matrix on a total number of the detection patterns.

6. An information recording and reproducing method comprising:

a reproducing step for generating a digital signal from an analog signal as information recorded in an information recording medium;

a recording compensation step for decoding the digital signal into a binary signal, generating an expectation signal based on the binary signal, detecting a signal difference between the digital signal and the expectation signal, and adjusting a recording condition for recording information into the information recording medium based on the signal difference; and a recording step for recording the information into the information recording medium based on the recording condition, wherein the adjustment of the recording condition is performed by detecting an edge shift as displacement of an edge for each of detection patterns from the signal difference and performing recording compensation, the adjustment including:

detecting a first matrix obtained by calculating a signal difference between a first reproduced signal and the expectation signal for each of the detection patterns;

obtaining a second reproduced signal when an edge for each of the detection patterns is changed by a predetermined amount;

detecting a second matrix obtained by calculating a signal difference between the second reproduced signal and the expectation signal for each of the detection patterns;

calculating a matrix of a conversion coefficient to the edge by dividing a difference between the first matrix and the second matrix by the predetermined amount; and calculating an edge shift based on the first matrix and an inverse matrix of the conversion coefficient.

* * * * *